United States Patent
Muller

(10) Patent No.: US 11,852,037 B2
(45) Date of Patent: Dec. 26, 2023

(54) RIM DRIVEN THRUSTER WITH ADJUSTABLE ROTOR BLADE PITCH

(71) Applicant: Peter Jacques Muller, Clinton, AR (US)

(72) Inventor: Peter Jacques Muller, Clinton, AR (US)

( * ) Notice: Subject to any disclaimer, the term of this patent is extended or adjusted under 35 U.S.C. 154(b) by 0 days.

(21) Appl. No.: 17/890,162

(22) Filed: Aug. 17, 2022

(65) Prior Publication Data
US 2023/0074750 A1    Mar. 9, 2023

Related U.S. Application Data

(60) Provisional application No. 63/240,952, filed on Sep. 5, 2021.

(51) Int. Cl.
| | | |
|---|---|---|
| *F01D 7/00* | (2006.01) | |
| *F01D 5/03* | (2006.01) | |
| *F01D 17/02* | (2006.01) | |

(52) U.S. Cl.
CPC ............... *F01D 7/00* (2013.01); *F01D 5/03* (2013.01); *F01D 17/02* (2013.01); *F05D 2220/323* (2013.01); *F05D 2240/24* (2013.01)

(58) Field of Classification Search
CPC ...... B63H 1/16; B63H 2001/165; B63H 3/02; B63H 11/00; F01D 5/03; F01D 7/00
See application file for complete search history.

(56) References Cited

U.S. PATENT DOCUMENTS

| | | | | |
|---|---|---|---|---|
| 2,652,505 | A * | 9/1953 | Matheisel | F03B 3/04 310/67 R |
| 5,249,992 | A | 10/1993 | Schneider | |
| 5,306,183 | A * | 4/1994 | Holt | H02K 21/14 440/6 |
| 6,786,087 | B2 | 9/2004 | Desa et al. | |
| 8,074,592 | B2 * | 12/2011 | Schroder | B63G 8/08 440/6 |
| 8,487,466 | B2 * | 7/2013 | Schroeder | B63H 5/10 415/60 |

(Continued)

FOREIGN PATENT DOCUMENTS

WO    PCT/US22/40641    8/2022

OTHER PUBLICATIONS

PCT Application No. PCT/US2022/04641 International Search Report and Written Opinion dated Nov. 15, 2022.
U.S. Appl. No. 63/178,948, Halverson.

*Primary Examiner* — Christopher R Legendre
(74) *Attorney, Agent, or Firm* — POLSINELLI LLP

(57) ABSTRACT

A flow control system, such as a thruster, includes an annular rotor within an annular housing. The annular rotor rotates about a central axis relative to the annular housing. The flow control system includes rotor blades with respective bases that are coupled to the annular rotor, and with respective tips directed toward the central axis. The flow control system includes a first actuator that rotates the annular rotor about the central axis relative to the annular housing, thus also rotating the rotor blades about the central axis relative to the annular housing. The flow control system includes a second actuator that rotates the rotor blades relative to the annular rotor. Actuation of the second actuator rotates a rotor blade about a rotor blade axis that extends from a base of the rotor blade toward the central axis.

20 Claims, 19 Drawing Sheets

(56) References Cited

U.S. PATENT DOCUMENTS

| | | | |
|---|---|---|---|
| 10,450,063 B1 | 10/2019 | Randall | |
| 10,618,617 B2 * | 4/2020 | Suzuki | B63H 23/24 |
| 11,509,201 B2 * | 11/2022 | Menheere | F04D 25/0606 |
| 2007/0292278 A1 | 12/2007 | Cornell et al. | |
| 2010/0279559 A1 | 11/2010 | Yoshikawa et al. | |
| 2020/0298959 A1 * | 9/2020 | Castellani | F01D 5/021 |
| 2023/0074750 A1 * | 3/2023 | Muller | F01D 5/03 |

* cited by examiner

```
                                                            ↙ 1800
```

┌─────────────────────────────────────────────────────────┐
│ Actuate a first actuator, wherein the first actuator is configured to │
│ rotate an annular rotor about a central axis relative to an annular │
│ housing, wherein rotation of the annular rotor about the central axis │
│ relative to the annular housing is configured to rotate a plurality of │
│ rotor blades about the central axis relative to the annular housing, │
│ wherein respective bases of the plurality of rotor blades are coupled │
│ to the annular rotor, wherein respective tips of the plurality of rotor │
│ blades are directed toward the central axis │
│ 1805 │
└─────────────────────────────────────────────────────────┘
                              ↓
┌─────────────────────────────────────────────────────────┐
│ Actuate a second actuator, wherein the second actuator is configured │
│ to rotate the plurality of rotor blades relative to the annular rotor, │
│ wherein actuation of the second actuator rotates a rotor blade about │
│ a rotor blade axis, the rotor blade axis extending from a base of the │
│ rotor blade toward the central axis │
│ 1810 │
└─────────────────────────────────────────────────────────┘

*FIG. 18*

RIM DRIVEN THRUSTER WITH ADJUSTABLE ROTOR BLADE PITCH

CROSS-REFERENCE TO RELATED APPLICATIONS

The present application claims the priority benefit of U.S. provisional application No. 63/240,952 filed Sep. 5, 2021 and entitled "Aerodynamic Thruster and Method of Operation of Same," the disclosure of which is hereby incorporated by reference in its entirety.

BACKGROUND

1. Field

The present teachings are generally related to thruster systems. More specifically, the present teachings relate to thruster systems including a rim-driven thruster with a rotating rim and rotor blades that are coupled to the rim and rotate about the rim.

2. Description of the Related Art

A thruster is propulsive device that controls the flow of a fluid, such as a gas or a liquid, to propel a vehicle in a particular direction. In aircraft, for instance, thrusters generally control the flow of air to propel the aircraft through the air. In watercraft, on the other hand, thrusters generally control the flow of water to propel the watercraft through the water. Generally, thrusters for aircraft include propellers. Propellers include blades extending from a central hub that rotates to rotate the blades.

SUMMARY

Flow control system systems and techniques are described. A flow control system, such as a thruster, includes an annular rotor within an annular housing. The annular rotor is configured to rotate about a central axis relative to the annular housing. The flow control system includes rotor blades. Respective bases of the rotor blades are coupled to the annular rotor, while respective tips of the rotor blades are directed toward the central axis. The flow control system includes a first actuator that is configured to rotate the annular rotor about the central axis relative to the annular housing, thus also rotating the rotor blades about the central axis relative to the annular housing. The flow control system includes a second actuator that is configured to rotate the rotor blades relative to the annular rotor. Actuation of the second actuator rotates a rotor blade about a rotor blade axis that extends from a base of the rotor blade toward the central axis.

In one example, an apparatus for flow control is provided. The apparatus includes an annular housing; an annular rotor within the annular housing, wherein the annular rotor is configured to rotate about a central axis relative to the annular housing; a plurality of rotor blades, wherein respective bases of the plurality of rotor blades are coupled to the annular rotor, wherein respective tips of the plurality of rotor blades are directed toward the central axis; a first actuator configured to rotate the annular rotor about the central axis relative to the annular housing, wherein rotation of the annular rotor about the central axis relative to the annular housing is configured to rotate the plurality of rotor blades about the central axis relative to the annular housing; and a second actuator configured to rotate the plurality of rotor blades relative to the annular rotor, wherein actuation of the second actuator rotates a rotor blade about a rotor blade axis, the rotor blade axis extending from a base of the rotor blade toward the central axis.

In another example, a method for flow control is provided. The method includes actuating a first actuator, wherein the first actuator is configured to rotate an annular rotor about a central axis relative to an annular housing, wherein rotation of the annular rotor about the central axis relative to the annular housing is configured to rotate a plurality of rotor blades about the central axis relative to the annular housing, wherein respective bases of the plurality of rotor blades are coupled to the annular rotor, wherein respective tips of the plurality of rotor blades are directed toward the central axis; and actuating a second actuator, wherein the second actuator is configured to rotate the plurality of rotor blades relative to the annular rotor, wherein actuation of the second actuator rotates a rotor blade about a rotor blade axis, the rotor blade axis extending from a base of the rotor blade toward the central axis.

In another example, a non-transitory computer-readable medium is provided having stored thereon instructions that, when executed by one or more processors, cause the one or more processors to: actuating a first actuator, wherein the first actuator is configured to rotate an annular rotor about a central axis relative to an annular housing, wherein rotation of the annular rotor about the central axis relative to the annular housing is configured to rotate a plurality of rotor blades about the central axis relative to the annular housing, wherein respective bases of the plurality of rotor blades are coupled to the annular rotor, wherein respective tips of the plurality of rotor blades are directed toward the central axis; and actuating a second actuator, wherein the second actuator is configured to rotate the plurality of rotor blades relative to the annular rotor, wherein actuation of the second actuator rotates a rotor blade about a rotor blade axis, the rotor blade axis extending from a base of the rotor blade toward the central axis.

In another example, an apparatus for flow control is provided. The apparatus includes means for actuating a first actuator, wherein the first actuator is configured to rotate an annular rotor about a central axis relative to an annular housing, wherein rotation of the annular rotor about the central axis relative to the annular housing is configured to rotate a plurality of rotor blades about the central axis relative to the annular housing, wherein respective bases of the plurality of rotor blades are coupled to the annular rotor, wherein respective tips of the plurality of rotor blades are directed toward the central axis; and means for actuating a second actuator, wherein the second actuator is configured to rotate the plurality of rotor blades relative to the annular rotor, wherein actuation of the second actuator rotates a rotor blade about a rotor blade axis, the rotor blade axis extending from a base of the rotor blade toward the central axis.

In some aspects, the first actuator includes at least one electromagnet coupled to the annular housing, wherein the first actuator is configured to rotate the annular rotor about the central axis relative to the annular housing by activating the at least one electromagnet to produce a magnetic effect on at least one portion of the annular rotor. In some aspects, the at least one portion of the annular rotor includes at least one of a magnet or a ferromagnetic material.

In some aspects, the base of the rotor blade is coupled to the annular rotor using a fastener, and wherein the rotor blade axis extends from a position of the fastener at the base of the rotor blade.

In some aspects, the second actuator is configured to rotate the plurality of rotor blades relative to the annular rotor from a first rotor blade rotation configuration to a second rotor blade rotation configuration, wherein the second rotor blade rotation configuration is associated with a higher torque than the first rotor blade rotation configuration. In some aspects, the second actuator is configured to move an annular rotor control mechanism within the annular rotor translationally relative to the annular rotor, wherein movement of the annular rotor control mechanism translationally relative to the annular rotor is configured to push on portions of the respective bases of the plurality of rotor blades to rotate the plurality of rotor blades relative to the annular rotor. In some aspects, the second actuator is configured to rotate the plurality of rotor blades relative to the annular rotor based on a rotational speed of the annular rotor about the central axis relative to the annular housing as monitored using a sensor.

In some aspects, respective lengths of the plurality of rotor blades are less than a radius of the annular rotor, wherein the radius of the annular rotor is measured from the annular rotor to the central axis.

In some aspects, the annular housing is coupled to a plurality of stator blades, wherein a fluid flow passing through the annular housing is configured to reach the plurality of stator blades after reaching the plurality of rotor blades.

In some aspects, a thruster includes the annular housing and the annular rotor and the plurality of rotor blades and the first actuator and the second actuator, wherein the thruster is coupled to a vehicle, and wherein the thruster is configured to provide thrust to propel the vehicle. In some aspects, the thruster is coupled to the vehicle using a movable mounting mechanism that is configured to transition between a first orientation and a second orientation, wherein the thrust provided by the thruster propels the vehicle in a first direction while the movable mounting mechanism is in the first orientation, and wherein the thrust provided by the thruster propels the vehicle in a second direction while the movable mounting mechanism is in second orientation. In some aspects, the vehicle is an aircraft.

In some aspects, a plurality of wheels are coupled to the annular housing and are configured to prevent translational movement of the annular rotor relative to the annular housing while the annular rotor rotates about the central axis relative to the annular housing. In some aspects, a plurality of electromagnets are coupled to the annular housing and are configured to prevent translational movement of the annular rotor relative to the annular housing while the annular rotor rotates about the central axis relative to the annular housing.

In some aspects, the apparatus is part of, and/or includes, a thruster, a propulsion device, a vehicle, a wireless communication device, a camera, a computer, a server, another device, or a combination thereof. In some aspects, the apparatus includes a camera or multiple cameras for capturing one or more images. In some aspects, the apparatus includes sensors for measuring airspeed, air pressure, airflow direction, temperature, altitude, location, orientation, rotations, acceleration, inertial measurement(s), or a combination thereof.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE FIGURES

FIG. 18 is a flow diagram illustrating exemplary operations for a process for flow control, in accordance with some examples.

DETAILED DESCRIPTION

Figure 1:
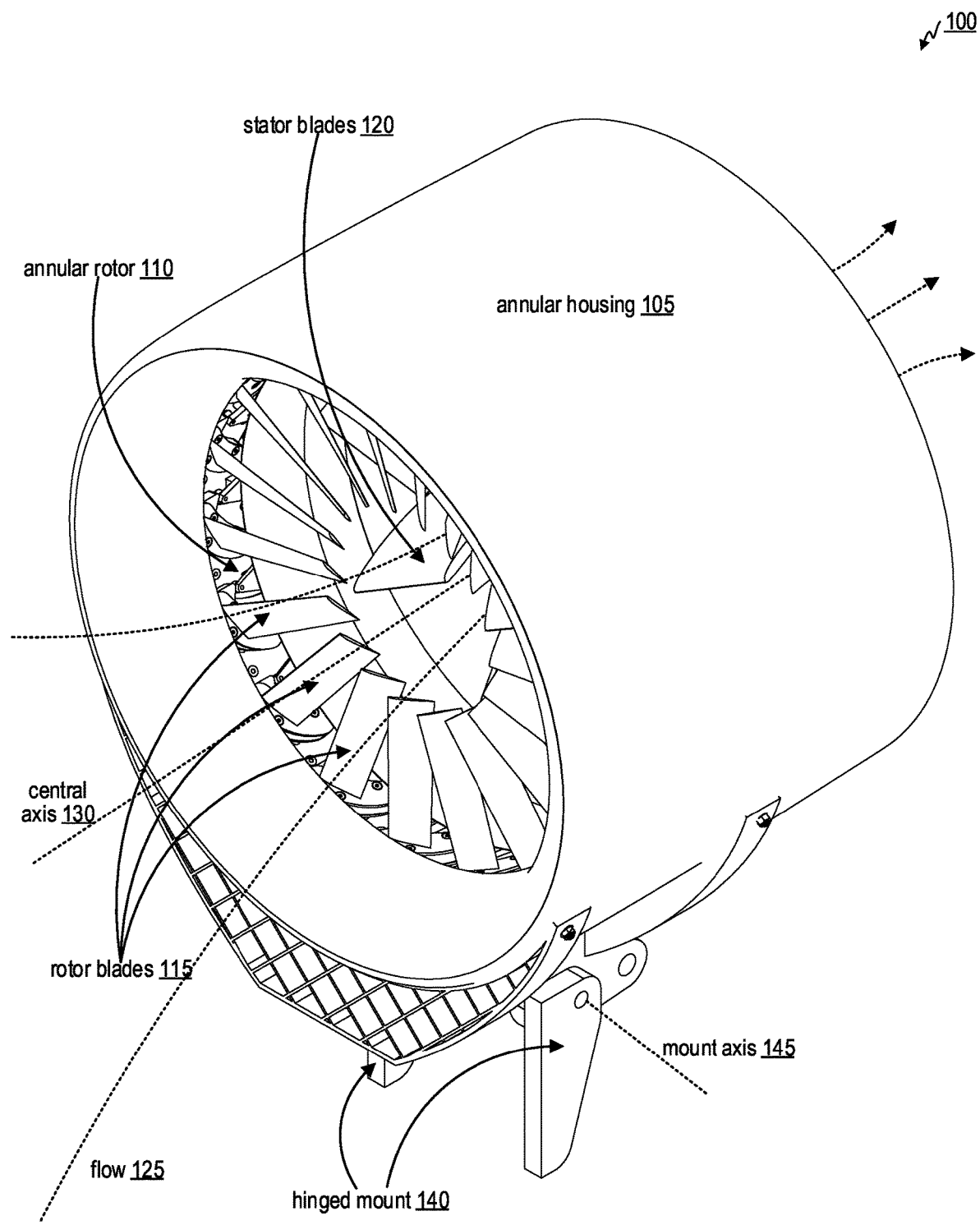
FIG. 1 is a perspective diagram illustrating a thruster, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A thruster is propulsive device that controls the flow of a fluid, such as a gas or a liquid, to propel a vehicle in a particular direction. In aircraft, for instance, thrusters generally control the flow of air to propel the aircraft through the air. In watercraft, on the other hand, thrusters generally control the flow of water to propel the watercraft through the water. Generally, thrusters for aircraft include propellers. Propellers include blades extending from a central hub that rotates to rotate the blades.

Flow control system systems and techniques are described. A flow control system, such as a thruster, includes an annular rotor within an annular housing. The annular rotor is configured to rotate about a central axis relative to the annular housing. The flow control system includes rotor blades. Respective bases of the rotor blades are coupled to the annular rotor, while respective tips of the rotor blades are directed toward the central axis. The flow control system includes a first actuator that is configured to rotate the annular rotor about the central axis relative to the annular housing, thus also rotating the rotor blades about the central axis relative to the annular housing. The flow control system includes a second actuator that is configured to rotate the rotor blades relative to the annular rotor. Actuation of the second actuator rotates a rotor blade about a rotor blade axis that extends from a base of the rotor blade toward the central axis.

The systems and techniques for flow control described herein, including the thrusters described herein, provide a number of technical improvements over other thrusters. The thrusters described herein provide significantly reduced power usage over propeller-based thrusters. For instance, in tests, the thrusters described herein use approximately ⅓ of the power (in Watts) to provide the same amount of thrust over time compared to a propeller-based thruster. Using that power, the thrusters described herein can safely achieve higher rotation speeds (e.g., 5600 rotations per minute (RPM)) compared to rotations speeds of 2800 RPM for the propeller-based thruster. Because higher rotational speeds have the ability to move air more quickly and given that thrust generated is proportional to the square of the speed of the air, this further increases the efficiency of the thrusters described herein over a propeller-based thruster. The propeller-based thruster uses lower rotation speeds because the propeller-based thruster must be cautious not to exceed blade tip speeds that might cause cavitation or a sonic boom. The thrusters described herein effectively avoid cavitation and/or sonic booms at or from blade tips due to the blade tips being closer to the center of the thruster. Even so, the propeller-based thruster reaches potentially dangerous blade tip speeds, while the thrusters described herein stay below much safer blade tip speeds. The thrusters described herein includes safer internal pressures than in propeller-based thrusters. The thrusters described herein ultimately produce more thrust than the propeller-based thruster, at least because the higher rotational speeds of the rotor blades move air more quickly, because thrust generated is proportional to the square of the speed of the air, because the thrusters described herein include a central gap through which air can flow freely in place of a propeller's central column that blocks airflow, and because stator blades generate additional thrust while reducing rotation in the airflow coming from the rotor blades.

FIG. 1 is a perspective diagram illustrating a thruster 100. The thruster 100 includes an annular housing 105 that encircles a central axis 130. The thruster 100 includes an annular rotor 110 within the annular housing 105. The annular rotor 110 also encircles the central axis 130. The exterior surface of the annular rotor 110 faces the interior surface of the annular housing 105. In some examples, at a given point along the annular rotor 110, the exterior surface of the annular rotor 110 is parallel to the interior surface of the annular housing 105. The thruster 100 may be based upon an electromechanically driven turbomachine.

The thruster 100 includes rotor blades 115. For instance, the thruster 100 is illustrated with eighteen rotor blades. The respective tips of the rotor blades 115 are directed inward toward the central axis 130. The respective bases of the rotor blades 115 are coupled to the annular rotor 110. An actuator (not pictured in FIG. 1) of the thruster 100 rotates the annular rotor 110 about the central axis 130 and relative to the annular housing 105. For instance, the actuator can rotate the annular rotor 110 clockwise or counter-clockwise about the central axis 130 and relative to the annular housing 105. By rotating the annular rotor 110 about the central axis 130 and relative to the annular housing 105, the actuator also rotates the rotor blades 115 about the central axis 130 and relative to the annular housing 105. The thruster 100 may be referred to as a rim-driven thruster. The annular rotor 110 may be referred to as a rim or an annular rim of the rim-driven thruster.

In some examples, the rotation of the rotor blades 115 pulls flow 125 from outside the thruster 100 into the front side of the thruster 100. The flow 125 passes through and/or past the rotor blades 115. In some examples, the thruster 100 includes a set of stator blades 120 coupled to the annular housing 105. In such examples, the flow 125 can pass through and/or past a set of stator blades 120 coupled to the annular housing 105. In some examples, the rotation of the rotor blades 115 pushes the flow 125 out of the rear side of the thruster 100, producing thrust. The stator blades 120 are stationary, but can nonetheless provide additional thrust. For instance, in some examples, the stator blades 120 can direct the flow 125 that is pushed out of the thruster 100. In some examples, the stator blades 120 can be arranged so that the flow 125 that passes through and/or past the rotor blades 115 pushes on the stator blades 120.

In some examples, the lengths of the rotor blades 115 can be less than a radius of the annular rotor 110 and/or a radius of the annular housing 105. The radius of the annular rotor 110 can be measured from the interior surface of the annular rotor 110 to the central axis 130. The radius of the annular housing 105 can be measured from the interior surface of the annular housing 105 to the central axis 130. For instance, the lengths of the rotor blades 115 can be less than a distance from the interior surface of the annular rotor 110 to the central axis 130. Similarly, the lengths of the rotor blades 115 can be less than a distance from the interior surface of the annular housing 105 to the central axis 130. The result is that there is a cylindrical gap in the center of the thruster 100, at and around the central axis 130, through which the flow 125 can move freely. This gap is illustrated further as the gap 805, for instance in FIG. 8A. This gap provides a significant improvement to flow 125, and therefore thrust produced by the thruster 100, compared to thrusters that use propellers. For instance, thrusters that use propellers include a central drive shaft about which the propeller rotates, and therefore do not include such a gap. The lack of such a central drive shaft in the thruster 100, and the inclusion of a gap around the central axis 130 in its place, is akin to unclogging a drain, and allows for a significantly larger portion of the thruster 100 to be available for the flow 125 to pass through. The gap between the tips of the rotor blades 115 and around the central axis 130 additionally provides a completely unimpeded path for the flow 125, which thrusters that use propellers typically do not have at all, and which further improves flow 125, and therefore thrust, provided by the thruster 100.

The thruster 100 also includes a hinged mount 140. The hinged mount 140 can be used to couple the thruster 100 to a vehicle, such as an aircraft, a watercraft, a ground vehicle, a hovercraft, or a combination thereof. The hinged mount 140 can be hinged to rotate the thruster 100 about a mount axis 145 between a first orientation and a second orientation. In some examples, the thrust provided by the thruster 100 propels the vehicle in a first direction while the hinged mount 140 is arranged in the first orientation, while the thrust provided by the thruster 100 propels the vehicle in a second direction while the hinged mount 140 is arranged in the second orientation. In an illustrative example, the first orientation can provide lateral thrust and propulsion to the vehicle, while the second orientation can provide downward thrust and vertical propulsion (e.g., for vertical takeoff and landing (VTOL)) to the vehicle. The hinged mount 140 can be a type of movable mount or a movable mounting mechanism that can be used in the position the hinged mount 140 is illustrated in. The hinged mount 140, the movable mount, and/or the movable mounting mechanism can move and/or rotate using one or more hinges, one or more wheels, one or more gears, one or more pulleys, other rotation mechanisms, or a combination thereof.

Figure 2:
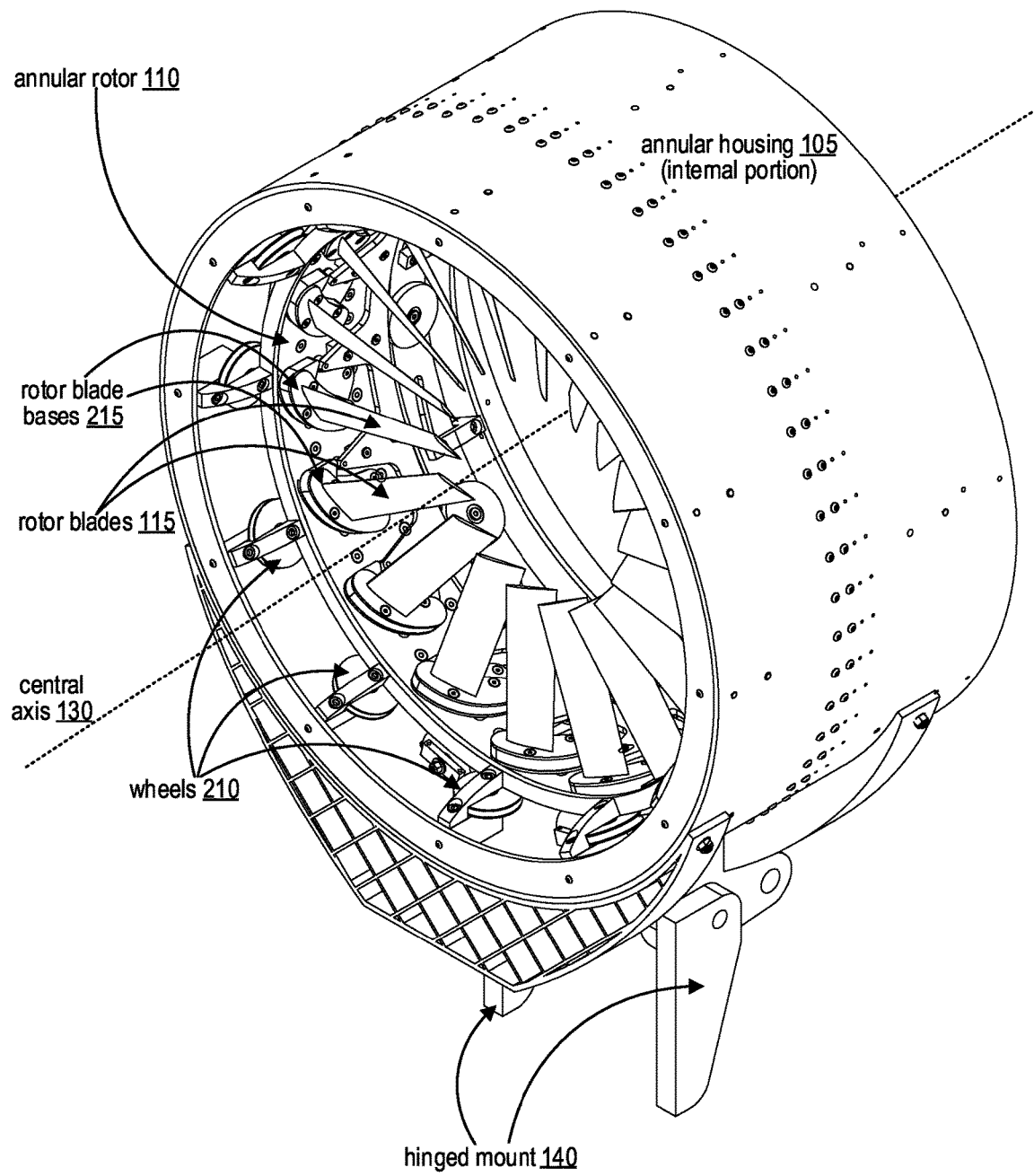
FIG. 2 is a sectional perspective diagram illustrating a thruster without an exterior surface of the annular housing, in accordance with some examples.

FIG. 2 is a sectional perspective diagram 200 illustrating a thruster 100 without an exterior surface of the annular housing 105 illustrated. A set of wheels 210 are coupled to the annular housing 105 of the thruster 100 in an annular arrangement. The wheels 210 serve as a track along which the annular rotor 110 rotates. The wheels 210 prevent the annular rotor 110 from moving laterally along the central axis 130 while the annular rotor 110 rotates about the central axis 130 and relative to the annular housing 105.

The rotor blades 115 are coupled to the annular rotor 110 via respective rotor blade bases 215 of the rotor blades 115. In some examples, the thruster 100 can change the pitch of the rotor blades 115 by rotating the rotor blade bases 215 relative to the annular rotor 110, for instance as illustrated in and discussed with respect to FIG. 7.

Figure 3:
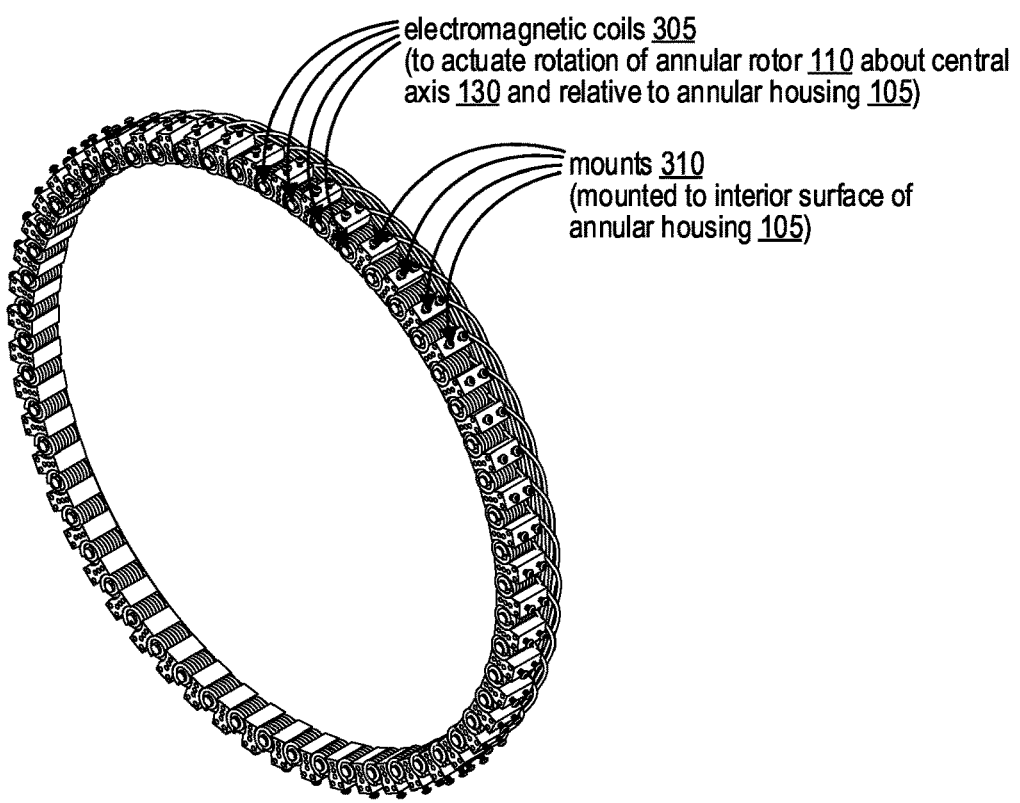
FIG. 3 is a perspective diagram illustrating an annular arrangement of electromagnetic coils of the annular housing of the thruster, in accordance with some examples.

FIG. 3 is a perspective diagram illustrating an annular arrangement 300 of electromagnetic coils 305 of the annular housing 105 of the thruster 100. The annular arrangement 300 includes both electromagnetic coils 305 and mounts 310. The mounts 310 are used to mount the annular arrangement 300 of electromagnetic coils 305 to the annular housing 105. The thruster 100 can use the electromagnetic coils 305 as an actuator for the rotation of the annular rotor 110 about the central axis 130 and relative to the annular housing 105. For instance, the thruster 100 can switch different electromagnetic coils 305 of the annular arrangement 300 between an "on" state in which the electromagnetic coils 305 generate a magnetic field and an "off" state in which the electromagnetic coils 305 do not generate a magnetic field, or generate a weak magnetic field. The electromagnetic coils 305 can thus produce a magnetic effect on at least one portion of the annular rotor. While the electromagnetic coils 305 are illustrated as coils, they may be electromagnets of another type. In some examples, the annular arrangement 300 may include magnets and/or ferromagnetic materials instead of, or in addition to, some of the electromagnetic coils 305.

Figure 4:
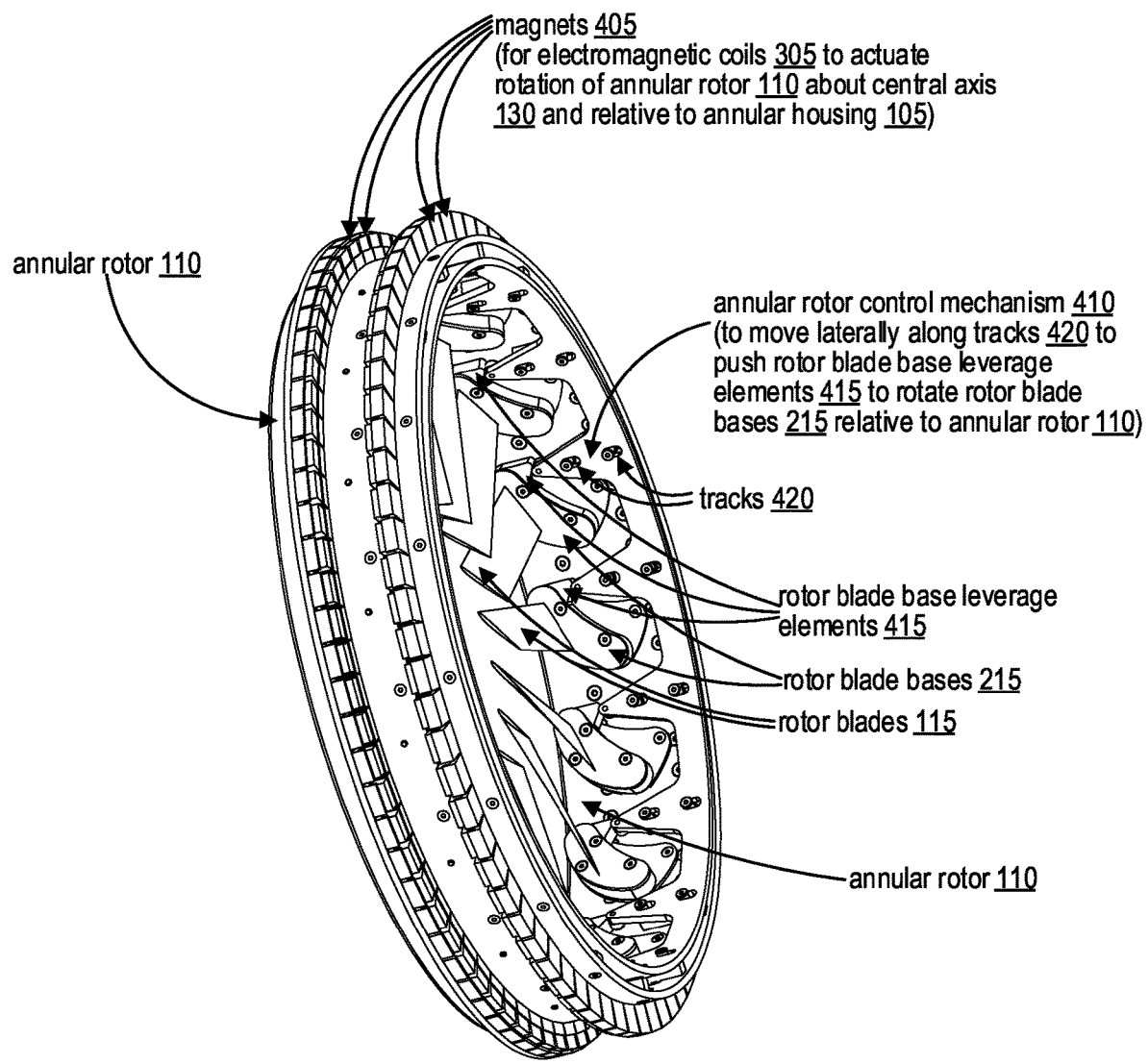
FIG. 4 is a perspective diagram illustrating the annular rotor of the thruster, with an annular arrangement of magnets to magnetically interact with the electromagnetic coils of the annular housing, and with an annular rotor control mechanism, in accordance with some examples.
Figure 5:
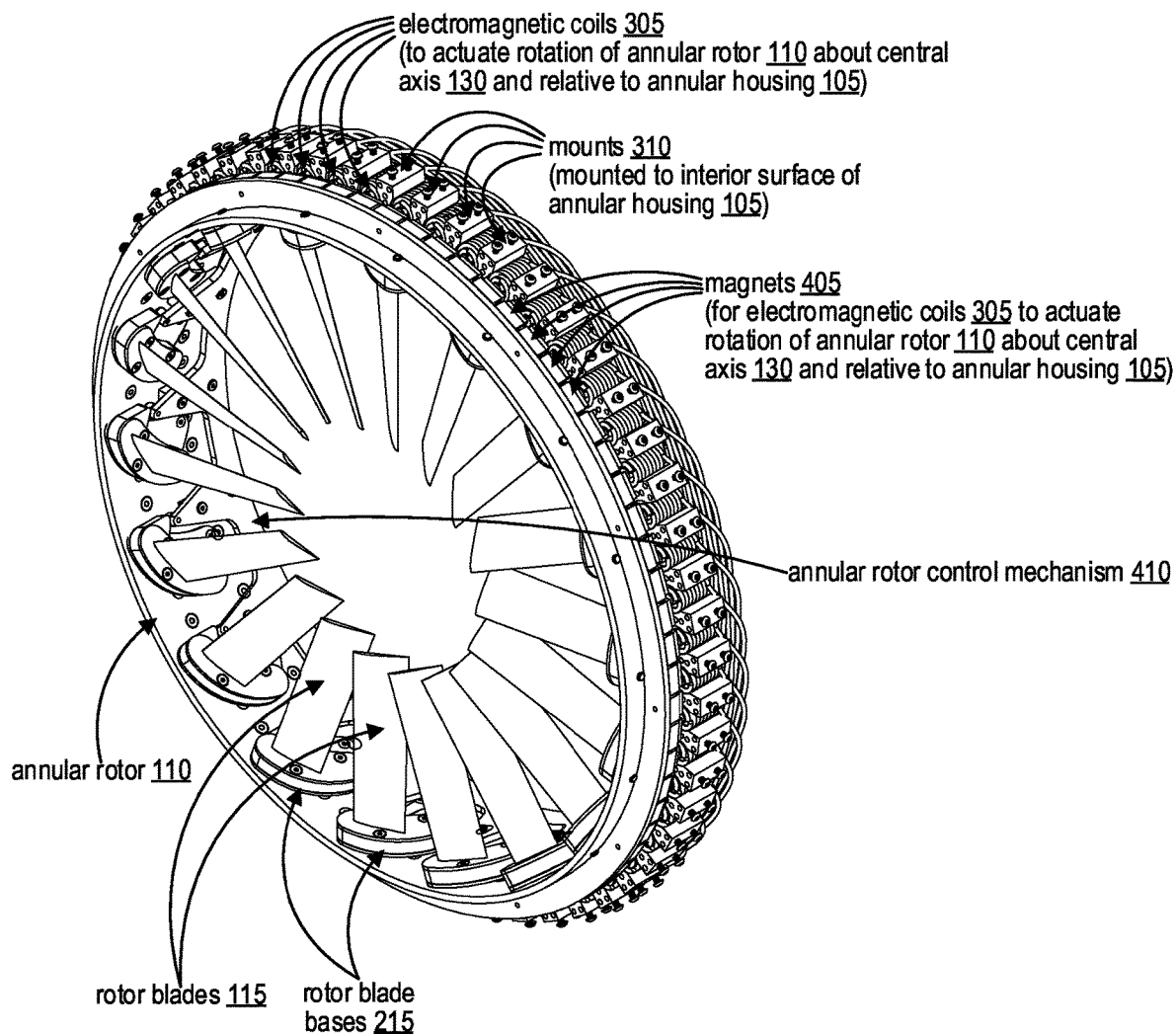
FIG. 5 is a perspective diagram illustrating the annular arrangement of electromagnetic coils arranged between the annular arrangement of magnets of the annular rotor, without the annular housing, in accordance with some examples.

FIG. 4 is a perspective diagram 400 illustrating the annular rotor 110 of the thruster 100, with an annular arrangement of magnets 405 to magnetically interact with the electromagnetic coils 305 of the annular housing 105, and with an annular rotor control mechanism 410. The magnets 405 are arranged in two rows along the exterior surface of the annular rotor 110, so that the electromagnetic coils 305 slot between the two rows of magnets 405 as illustrated in FIG. 5. In some examples, the annular rotor 110 can include electromagnets and/or ferromagnetic materials in place of the magnets 405.

Figure 7:
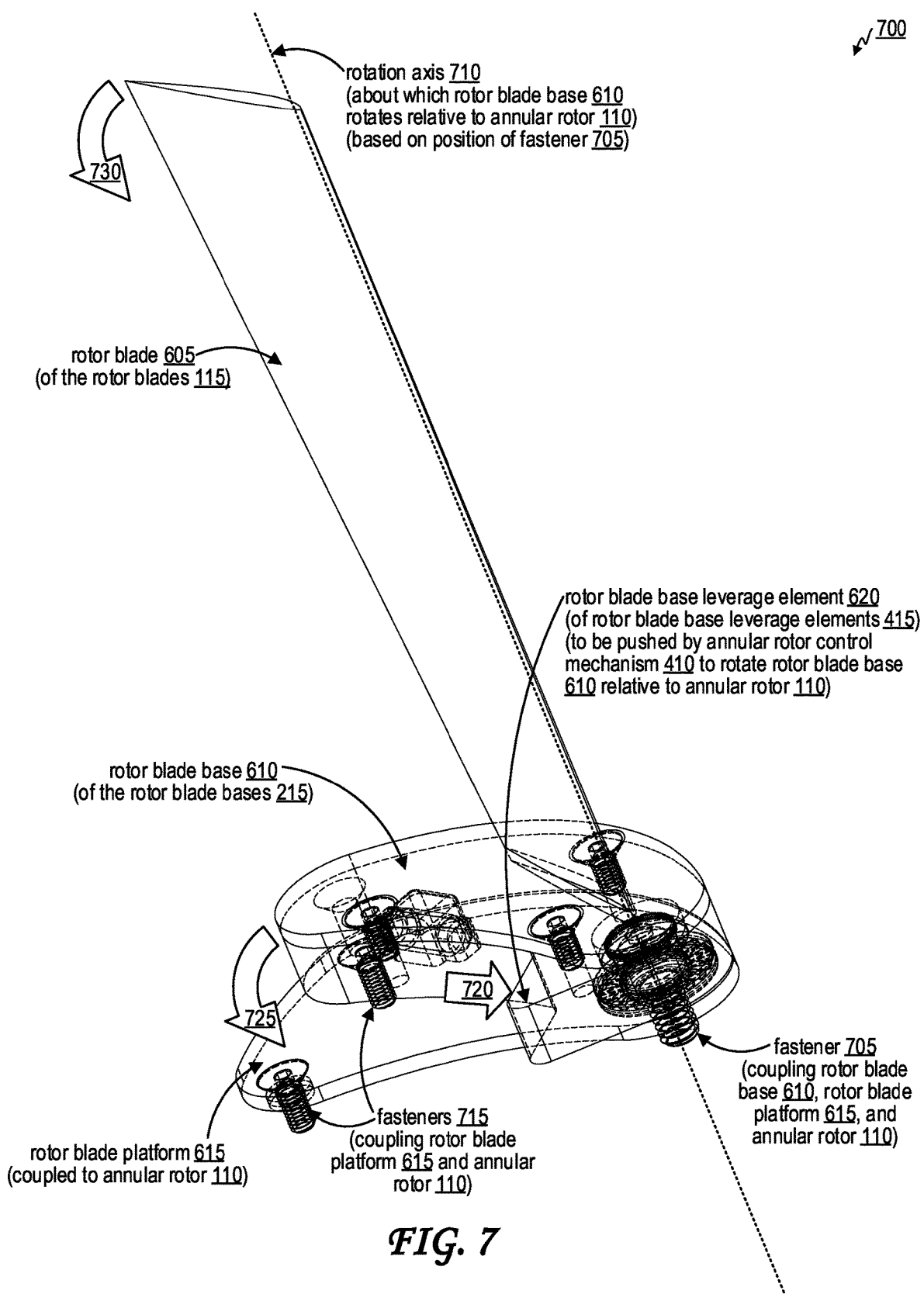
FIG. 7 is a perspective diagram illustrating a rotor blade assembly with multiple fasteners illustrated, in accordance with some examples.

As noted previously, the rotor blades 115 are coupled to the interior surface of the annular rotor 110 using the rotor blade bases 215. The rotor blade bases 215 include rotor blade base leverage elements 415. The rotor blade base leverage elements 415 are illustrated as rounded nubs extending from the sides of the rotor blade bases 215. A force pressing on the rotor blade base leverage elements 415 can cause the rotor blade bases 215 to rotate as illustrated in FIG. 7.

The annular rotor 110 includes an annular rotor control mechanism 410. The annular rotor control mechanism 410 is shaped like a ring around the central axis 130, with "teeth" extending laterally along the central axis from the ring. The annular rotor control mechanism 410 is configured to move laterally along the central axis 130 relative to the annular housing 105 by sliding along tracks 420. The tracks 420 are slots in the annular rotor control mechanism 410 through which a fastener (e.g., a screw, a nail, a bolt, a post, or a combination thereof) passes, with the fastener coupled to the annular housing 105. By sliding along the tracks 420, the annular rotor control mechanism 410 can move between a first position in which the annular rotor control mechanism 410 is not pressing on the rotor blade base leverage elements 415, and a second position in which the annular rotor control mechanism 410 is pressing on the rotor blade base leverage elements 415. In some examples, the annular rotor control mechanism 410 may be referred to as an annular rotor control member, an annular rotor control ring, an annular rotor control pusher, an annular rotor control element, or a combination thereof.

FIG. 5 is a perspective diagram illustrating the annular arrangement of electromagnetic coils 305 arranged between the annular arrangement of magnets 405 of the annular rotor 110, without the annular housing 105. Because the annular arrangement of electromagnetic coils 305 are arranged between the annular arrangement of magnets 405, the magnetic fields generated by the electromagnetic coils 305 can provide magnetic effects on the annular arrangement of magnets 405, for example to attract or repel magnets 405 of the annular arrangement of magnets 405. These magnetic effects can actuate rotation of the annular rotor 110 about the central axis 130 relative to the annular housing 105 that the electromagnetic coils 305 are coupled to. In some examples, the electromagnetic coils 305 produce a rotating magnetic field (RMF) that interacts with the magnets 405, driving rotation of the annular rotor 110 about the central axis 130 and relative to the annular housing 105.

In some examples, the arrangement of electromagnetic coils 305 can be referred to as an actuator that actuates the rotation of the annular rotor 110 about the central axis 130 relative to the annular housing 105. In some examples, the thruster 100 may instead, or additionally, include a different actuator for actuating the rotation of the annular rotor 110 about the central axis 130 relative to the annular housing 105, such as a set of wheels coupled to the annular housing 105 and configured to rotate the annular rotor 110 about the central axis 130 relative to the annular housing 105. The arrangement of electromagnetic coils 305 and magnets 405 provides a benefit over a wheel-based implementation, however, in that friction between the annular rotor 110 and the annular housing 105 is reduced.

Figure 6:
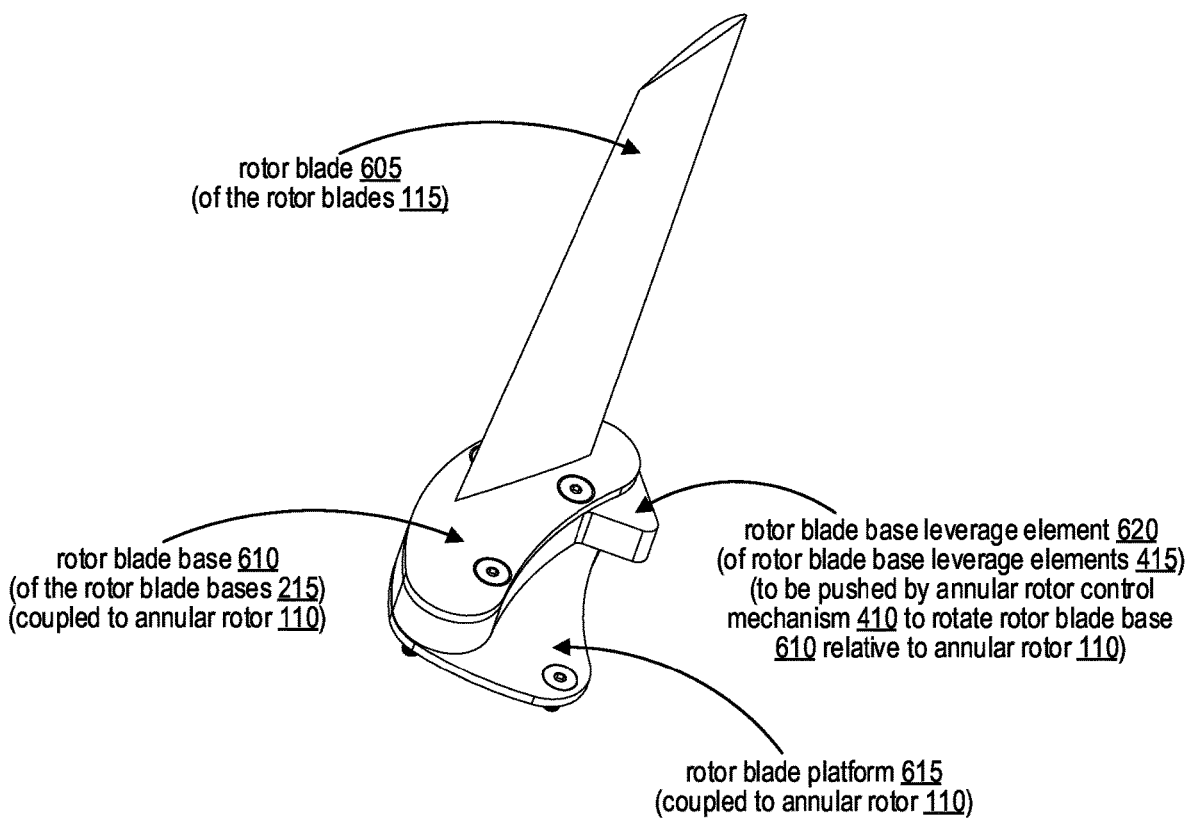
FIG. 6 is a perspective diagram illustrating a rotor blade assembly that includes a rotor blade, a rotor blade base, and a rotor blade platform, in accordance with some examples.

FIG. 6 is a perspective diagram illustrating a rotor blade assembly 600 that includes a rotor blade 605, a rotor blade base 610, and a rotor blade platform 615. The rotor blade 605 is an example of the rotor blades 115 of the thruster 100. The rotor blade base 610 is an example of the rotor blade bases 215 of the thruster 100, and is configured to be coupled to the annular rotor 110. The rotor blade base leverage element 620 is an example of the rotor blade base leverage elements 415, and is a part of the rotor blade base 610. The rotor blade platform 615 is also coupled to the annular rotor 110, and is fixed relative to the annular rotor 110. Thus, when the rotor blade base 610 rotates relative to the annular rotor 110 (e.g., when the annular rotor control mechanism 410 pushes on the rotor blade base leverage element 620), the rotor blade base 610 also rotates relative to the rotor blade platform 615.

FIG. 7 is a perspective diagram illustrating a rotor blade assembly 700 with multiple fasteners illustrated. The rotor blade assembly 700 is an example of the rotor blade assembly 600 that is illustrated in a transparent fashion, with components such as fasteners that are hidden in the illustration of FIG. 6 visible in FIG. 7. For instance, two fasteners 715 are illustrated that fasten the rotor blade platform 615 to the annular rotor 110, so that the rotor blade platform 615 is stationary relative to the annular rotor 110.

A fastener 705 is illustrated coupling the rotor blade base 610 and the rotor blade platform 615 to the annular rotor 110. A rotation axis 710 for the rotor blade base 610 and the rotor blade 605 itself extends from the position of the fastener 705. In some examples, the rotation axis 710 may be orthogonal to the rotor blade base 610 and/or the rotor blade platform 615. In some examples, the rotation axis 710 may be parallel to the length of the rotor blade 605 itself. In some examples, the rotation axis 710 may be a line extending from the fastener 705 to the central axis 130 (e.g., between the fastener 705 and the central axis 130). In some examples, the rotation axis 710 may extend along the length of the rotor blade 605. In some examples, the rotation axis 710 may extend along the length of the rotor blade 605 along at least one side and/or surface of the rotor blade 605. In some examples, the rotation axis 710 may extend along the length of the rotor blade 605 along a center of the rotor blade 605 (e.g., the center of the rotor blade 605 in terms of width and/or thickness of the rotor blade 605). In some examples, the rotation axis 710 may extend along the length of the rotor blade 605 along an interior portion of the rotor blade 605 (in terms of width and/or thickness of the rotor blade 605). Additional fasteners are also illustrated that are part of the rotor blade base 610. The fastener 705, and the fasteners 715, and the additional fasteners of the rotor blade base 610, may each include a screw, a nail, a bolt, a post, or a combination thereof.

An arrow 720 is illustrated representing a force pushing on the rotor blade base leverage element 620. For instance, the arrow 720 can represent a force supplied by one of the teeth of the annular rotor control mechanism 410 on the rotor blade base leverage element 620, in response to the annular rotor control mechanism 410 sliding along the tracks 420 toward the front of the thruster 100 (and thus toward the rotor blade base leverage element 620). Because the rotor blade base 610 rotates about the rotation axis 710 defined by the position of the fastener 705 that couples the rotor blade base 610 to the annular rotor 110, the force indicated by the arrow 720 pushing on the rotor blade base leverage element 620 causes the rotor blade base 610 to rotate about the rotation axis 710 as indicated by the arrow 725. The rotor blade base 610 can rotate relative to the rotor blade platform 615, which can remain fixed and stationary relative to the annular rotor 110. The rotor blade base 610 can rotate relative to the annular rotor 110. The rotation indicated by the arrow 725 causes the rotor blade 605 to also rotate about the rotation axis as illustrated by the arrow 730. The rotation of the rotor blade 605 illustrated by the arrow 730 can match the rotation of the rotor blade base 610 illustrated by the arrow 725. The rotor blade 605 can rotate relative to the rotor blade platform 615, which can remain fixed and stationary relative to the annular rotor 110. The rotor blade 605 can rotate relative to the annular rotor 110.

The rotor blade base leverage element 620 can be referred to as a rotor blade base lever member, a rotor blade base lever part, a rotor blade base lever portion, a rotor blade base lever end, a rotor blade base member, a rotor blade base part, a rotor blade base portion, a rotor blade base leverage point, a rotor blade base leverage area, a rotor blade base leverage portion, a rotor blade base leverage member, a rotor blade base leverage part, or a combination thereof. It should be understood that the rotor blade base 610, as a whole, may function as a lever, with the fastener 705 functioning as the fulcrum for the lever, and with the rotor blade base leverage element 620 functioning as one of the ends of the lever that can rotate the rotor blade base 610 about the fulcrum (about the fastener 705 and/or the rotation axis 710) when a force acts on the rotor blade base leverage element 620 (e.g., from the annular rotor control mechanism 410) to push or pull the rotor blade base leverage element 620.

The rotation of the rotor blade base 610 and the rotor blade 605 can produce a change in pitch of the rotor blade 605. By controlling when the annular rotor control mechanism 410 slides along the tracks 420 to provide the force indicated by the arrow 720, the thruster 100 can therefore control the pitch of the rotor blade 605, for instance causing the pitch of the rotor blade 605 to change from a first pitch (e.g., illustrated in the current pitch of the rotor blade 605 illustrated in FIG. 7) to a second pitch (e.g., following the rotation of the rotor blade 605 illustrated by the arrow 730). In some examples, the change in the pitch of the rotor blade 605 provided by the rotation illustrated by the arrow 730 can be a change of 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, a change in pitch of less than 5 degrees, a change in pitch of more than 90 degrees, or a change in pitch between any two previously-listed angle values. In an illustrative example, the change in the pitch of the rotor blade 605 provided by the rotation illustrated by the arrow 730 is approximately 25 degrees.

In some examples, the thruster 100 can slide the annular rotor control mechanism 410 between multiple possible positions along the tracks 420 to change between multiple possible pitch angles for the rotor blade 605 (and the other rotor blades 115). For instance, in some examples, the thruster 100 can slide the annular rotor control mechanism 410 from a first position to a second position to change the rotor blade 605 (and the other rotor blades 115) from a first pitch to a second pitch. The thruster 100 can then slide the annular rotor control mechanism 410 from the second position to a third position to change the rotor blade 605 (and the other rotor blades 115) from the second pitch to a third pitch. The thruster 100 can then slide the annular rotor control mechanism 410 from the third position back to the first position, or to a fourth position, to change the rotor blade 605 (and the other rotor blades 115) from the third pitch back to the first pitch, or to a fourth pitch, and so forth. In this way, the thruster 100 can dynamically change the pitch of the rotor blades 115 as needed.

In some examples, the thruster 100 can modify the pitch of the rotor blades 115 to control the flow 125 through the thruster 100, for instance to make the flow 125 more coarse or fine, to control the load of the flow 125 on the rotor blades 115, to control the load of the flow 125 on the stator blades 120, or a combination thereof. In some examples, modification of the pitch of the rotor blades 115 to be more coarse can also modify the thruster 100 to produce more torque and/or thruster, and vice versa. The thruster 100 can modify the pitch of the rotor blades 115 at certain points along a path of the vehicle that includes the thruster 100, for instance to increase or decrease how much force or energy is needed for the thruster 100 to provide and/or maintain a specified amount of thrust. In this way, the thruster 100 can modify the pitch of the rotor blades 115 for a similar purpose to modifying speeds on a bicycle, or to modifying gears in an automobile. The ability to provide dynamic variable pitch for the rotor blades 115 can provide further performance improvements over other thrusters without this capability.

The thruster 100 can cause changes to the pitch based on various metrics and/or heuristics, such as a rotation speed and/or rotation velocity (e.g., in rotations per minute (rpm) or rotations per second (rps)) of the annular rotor 110 about the central axis 130 relative to the annular housing 105 reaching or exceeding or falling below or otherwise crossing a predetermined rotation speed threshold and/or rotation velocity threshold, a speed of the flow 125 through the thruster 100 reaching or exceeding or falling below or otherwise crossing a predetermined flow speed threshold, a force from the flow 125 on the rotor blades 115 reaching or exceeding or falling below or otherwise crossing a predetermined force threshold, a force from the flow 125 on the stator blades 120 reaching or exceeding or falling below or otherwise crossing a predetermined force threshold, a temperature of the flow 125 reaching or exceeding or falling below or otherwise crossing a predetermined flow temperature threshold, a temperature of at least a portion of the thruster 100 reaching or exceeding or falling below or otherwise crossing a predetermined thruster temperature threshold, a speed and/or velocity of the thruster 100 reaching or exceeding or falling below or otherwise crossing a predetermined thruster speed threshold and/or thruster velocity threshold, an acceleration of the thruster 100 reaching or exceeding or falling below or otherwise crossing a predetermined thruster acceleration threshold, a pressure of the flow 125 (e.g., air pressure or water pressure) reaching or exceeding or falling below or otherwise crossing a predetermined flow pressure threshold, an altitude of the thruster 100 reaching or exceeding or falling below or otherwise crossing a predetermined altitude threshold, a location of the thruster 100 (e.g., latitude and/or longitude) reaching a predetermined area, an orientation of the thruster 100 (e.g., pitch, roll, and/or yaw) reaching or exceeding or falling below or otherwise crossing a predetermined orientation threshold, a maneuver being performed (or to be performed) by a vehicle that includes the thruster 100, or a combination thereof.

In some examples, the thruster 100 may determine the rotation speed and/or rotation velocity of the annular rotor 110 about the central axis 130 relative to the annular housing 105 based on how much power the thruster 100 has provided to an actuator (e.g., the arrangement of electromagnetic coils 305) that actuates the rotation of the annular rotor 110 about the central axis 130 relative to the annular housing 105. In some examples, the thruster 100 may include one or more sensors on the annular rotor 110 and/or the annular housing 105. The thruster 100 can use measurements from the sensors to determine the rotation speed and/or rotation velocity of the annular rotor 110 about the central axis 130 relative to the annular housing 105, the speed of the flow 125 through the thruster 100, the force from the flow 125 on the rotor blades 115, the force from the flow 125 on the stator blades 120, temperature of the flow 125, temperature of at least a portion of the thruster 100, a speed and/or velocity of the thruster 100, an acceleration of the thruster 100, a pressure of the flow 125, an altitude of the thruster 100, the location (e.g., latitude and/or longitude) of the thruster 100, the orientation (e.g., pitch, roll, and/or yaw) of the thruster 100, a maneuver being performed (or to be performed) by a vehicle that includes the thruster 100, or a combination thereof. The sensors may include, for instance, one or more accelerometers, gyrometers, inertial measurement units (IMUs), speedometers, thermometers, thermistors, barometers, altimeters, mass airflow sensors, airflow sensors, pressure sensors, air pressure sensors, global navigation satellite system (GNSS) receivers, or combinations thereof.

The thruster 100 may include such sensors on an exterior surface and/or an interior surface of the annular housing 105, an exterior surface and/or an interior surface of the annular rotor 110, on the rotor blade bases 215, on the rotor blades 115, on the annular rotor control mechanism 410, on the stator blades 120, on any other portion of the thruster 100, or a combination thereof. In some examples, the vehicle that the thruster 100 is coupled to may include at least some of the above sensors, and the thruster 100 can receive sensor data from these sensors and control the pitch of the rotor blades 115 based on the received sensor data. In some examples, the vehicle that the thruster 100 is coupled to may provide other data to the thruster 100, such as data identifying maneuver being performed (or to be performed) by the vehicle, or the location and/or orientation of the vehicle (and therefore of the thruster 100), which the thruster 100 can use to adjust the pitches of the rotor blades 115.

Figures 8A, 8B:
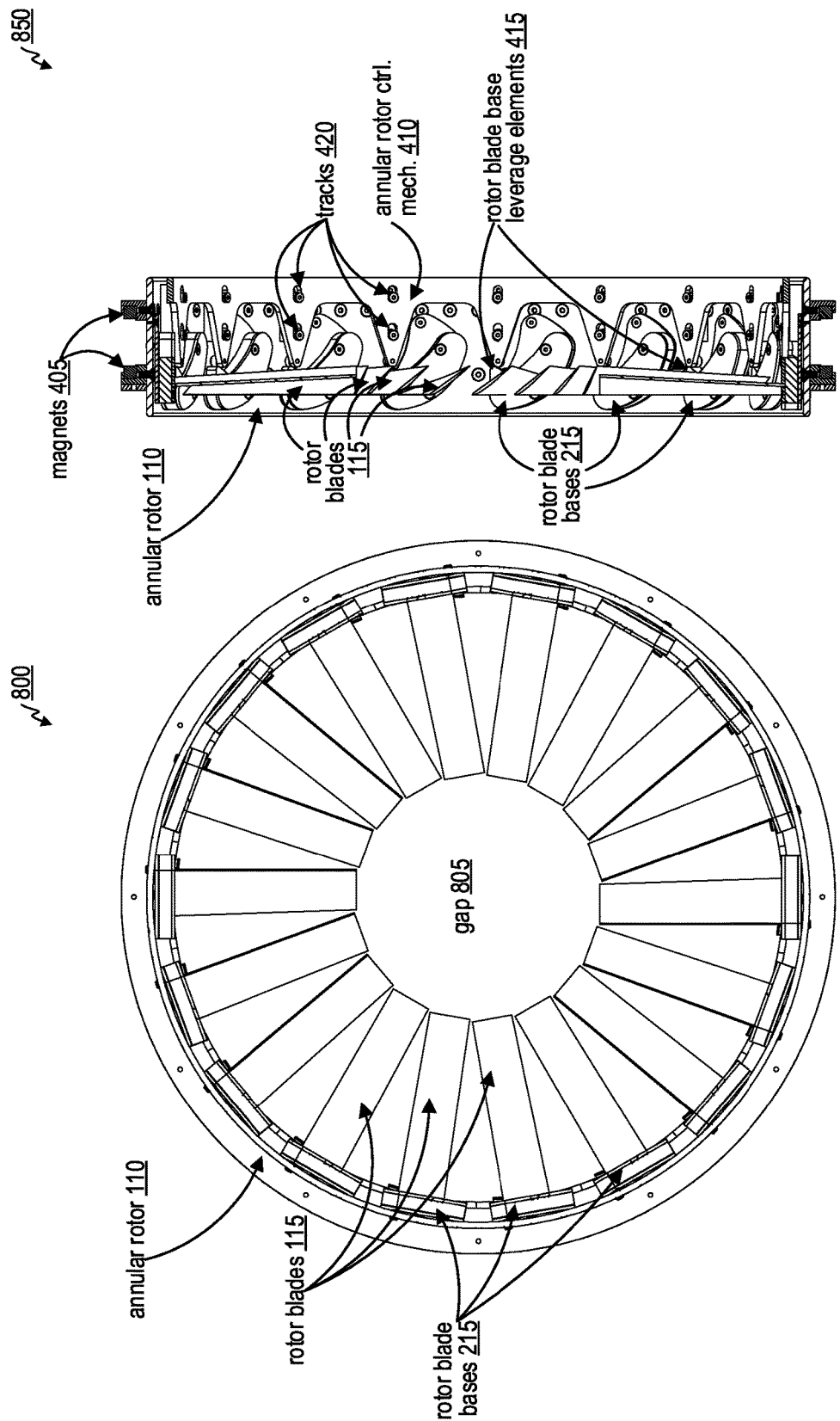
FIG. 8A is an orthogonal cutaway view diagram illustrating the annular rotor of the thruster from the front of the thruster, in accordance with some examples.
FIG. 8B is an orthogonal cutaway view diagram illustrating the annular rotor of the thruster from a side of the thruster, in accordance with some examples.

FIG. 8A is an orthogonal cutaway view 800 of the annular rotor 110 of a thruster 100 from the front of the thruster 100. The orthogonal cutaway view 800 shows eighteen rotor blades 115 coupled to the annular rotor 110 using the rotor blade bases 215. The gap 805 around the central axis, between the tips of the rotor blades 115, is clearly visible in the orthogonal cutaway view 800.

FIG. 8B is an orthogonal cutaway view 850 of the annular rotor 110 of the thruster 100 from a side of the thruster 100. The orthogonal cutaway view 850 of the annular rotor 110 provides a clear view of the rotor blades 115, the rotor blade bases 215 and their rotor blade base leverage elements 415, the annular rotor control mechanism 410 and its tracks 420, and the magnets 405.

Figures 9A, 9B:
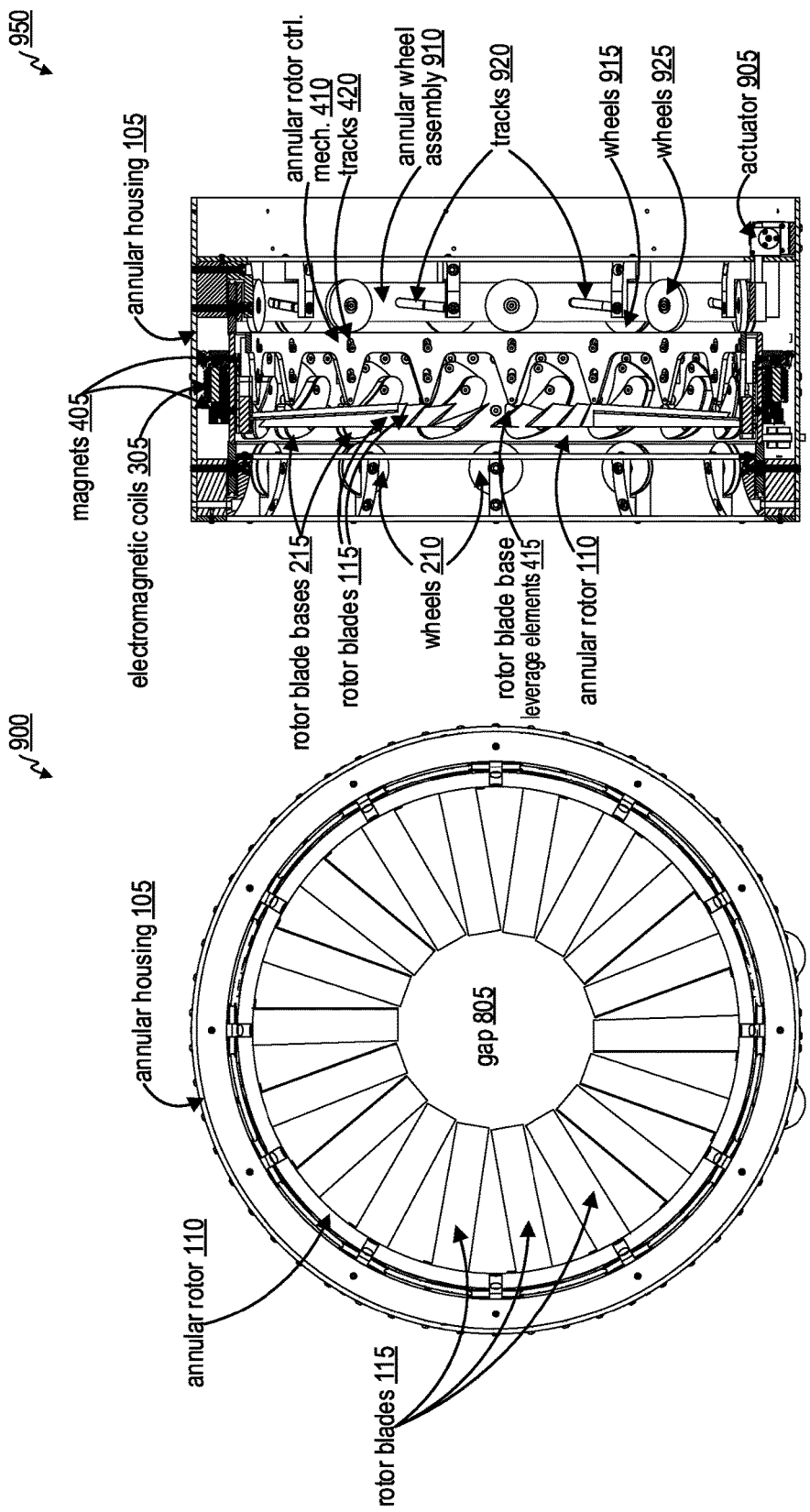
FIG. 9A is an orthogonal view diagram illustrating the thruster from the front of the thruster, in accordance with some examples.
FIG. 9B is an orthogonal cutaway view diagram illustrating the thruster from a side of the thruster, in accordance with some examples.

FIG. 9A is an orthogonal view 900 of the thruster 100 from the front of the thruster 100. The orthogonal view 900 shows the annular rotor 110 within the annular housing 105, and shows eighteen rotor blades 115 coupled to the annular rotor 110 using the rotor blade bases 215. The gap 805 around the central axis, between the tips of the rotor blades 115, is clearly visible in the orthogonal view 900.

FIG. 9B is an orthogonal cutaway view diagram 950 illustrating the thruster 100 from a side of the thruster 100. The orthogonal cutaway view diagram 950 of the thruster 100 provides a clear view of the annular housing 105, the annular rotor 110, the wheels 210, the rotor blades 115, the rotor blade bases 215 and their rotor blade base leverage elements 415, the annular rotor control mechanism 410 and its tracks 420, and the magnets 405 and electromagnetic coils 305. The orthogonal cutaway view diagram 950 of the thruster 100 also illustrates wheels 915 coupled to the annular housing 105. The wheels 915, like the wheels 210, are coupled to the annular housing 105 of the thruster 100 in an annular arrangement, and serve as a track along which the annular rotor 110 rotates. The wheels 210 and the wheels 915 act together to prevent the annular rotor 110 from moving laterally along the central axis 130 while the annular rotor 110 rotates about the central axis 130 and relative to the annular housing 105. For instance, the wheels 210 prevent the annular rotor 110 from moving laterally toward the front of the thruster 100 along the central axis 130, while the wheels 915 prevent the annular rotor 110 from moving laterally toward the rear of the thruster 100 along the central axis 130.

The orthogonal cutaway view diagram 950 of the thruster 100 also illustrates an actuator 905 that the thruster can use to move an annular wheel assembly 910 along a set of tracks 920. The annular wheel assembly 910 is shaped like a ring around the central axis 130, and includes a set of wheels 925. In some examples, the actuator 905 includes a motor, an electromagnet paired with a magnet or ferromagnetic material, or a combination thereof. The actuator 905, when actuated, is configured to move the annular wheel assembly 910 laterally along the central axis 130 relative to the annular housing 105 by sliding the annular wheel assembly 910 along the tracks 920. The tracks 920 are slots in the annular wheel assembly 910 through which a fastener (e.g., a screw, a nail, a bolt, a post, or a combination thereof) passes, with the fastener coupled to the annular housing 105 and/or the wheels 915. The wheels 925 of the annular wheel assembly 910 can make contact with the annular rotor control mechanism 410, and can allow the annular rotor control mechanism 410 to rotate freely relative to the annular wheel assembly 910. By sliding along the tracks 920, the annular wheel assembly 910 can move between a first position in which the wheels 925 of the annular wheel assembly 910 are not pressing on the annular rotor control mechanism 410, and a second position in which the wheels 925 of the annular wheel assembly 910 are pressing on the annular rotor control mechanism 410. By moving the annular wheel assembly 910 along the tracks 920 (e.g., from the first position to the second position), the actuator 905 can effectively use the wheels 925 of the annular wheel assembly 910 to push the annular rotor control mechanism 410 along the tracks 420, causing the teeth of the annular rotor control mechanism 410 to push the rotor blade base leverage elements 415. This, in turn, causes the rotor blades 115 and rotor blade bases 215 to rotate about respective rotor blade rotation axes (e.g., as in the rotation axis 710), changing the pitch of the rotor blades 115.

In some examples, the thruster 100 may use respective sets of magnets, electromagnets, and/or ferromagnetic materials coupled to the annular housing 105 and the annular rotor 110 instead of, or in addition to, the wheels 210, the wheels 915, and/or the wheels 925. For instance, in place of or in addition to the wheels 210, the thruster 100 may include a first set of magnets, electromagnets, and/or ferromagnetic materials coupled to the annular housing 105 and a second set of magnets, electromagnets, and/or ferromagnetic materials coupled to the annular rotor 110. These two sets of magnets, electromagnets, and/or ferromagnetic materials can use magnetic fields to repel one another, and can prevent the annular rotor 110 from moving laterally toward the front of the thruster 100 along the central axis 130. Similarly, in place of or in addition to the wheels 915, the thruster 100 may include a first set of magnets, electromagnets, and/or ferromagnetic materials coupled to the annular housing 105 and a second set of magnets, electromagnets, and/or ferromagnetic materials coupled to the annular rotor 110. These two sets of magnets, electromagnets, and/or ferromagnetic materials can use magnetic fields to repel one another, and can prevent the annular rotor 110 from moving laterally toward the rear of the thruster 100 along the central axis 130. Similarly, in place of or in addition to the wheels 925, the thruster 100 may include a first set of magnets, electromagnets, and/or ferromagnetic materials coupled to the annular rotor control mechanism 410 and a second set of magnets, electromagnets, and/or ferromagnetic materials coupled to the annular wheel assembly 910. These two sets of magnets, electromagnets, and/or ferromagnetic materials can use magnetic fields to repel one another, and can push the annular rotor control mechanism 410 along the tracks 420 in response to the actuator 905 moving the annular wheel assembly 910 along the tracks 920. Use of paired magnets, electromagnets, and/or ferromagnetic materials in this way to replace or supplement the wheels 210, the wheels 915, and/or the wheels 925 can reduce energy that can be otherwise lost due to friction (e.g., from the rotation of the wheels, from the wheels 210 against the annular rotor 110, from the wheels 915 against the annular rotor 110, and/or from the wheels 925 against the annular rotor control mechanism 410).

The thruster 100 can trigger the actuator 905 based on any of the sensors and/or other triggers discussed above with respect to movement of the annular rotor control mechanism 410. In an illustrative example, the thruster 100 may include use rotation speed sensors coupled to the annular rotor 110 and/or to the annular housing 105 to monitor the rotation speed (e.g., in rotations per minute and/or rotations per second) of the annular rotor 110 about the central axis 130 and relative to the annular housing 105. If the rotation speed sensors indicate that the rotation speed of the annular rotor 110 exceeds a first rotation speed threshold, the thruster 100 can actuate the actuator 905 to adjust the pitch of the rotor blades 115 to be more coarse, for instance by having the actuator 905 move the annular wheel assembly 910 along the tracks 920 to push the annular rotor control mechanism 410 along the tracks 420 to push the rotor blade base leverage elements 415 to rotate the rotor blade bases 215 and the rotor blades 115. If the rotation speed sensors indicate that the rotation speed of the annular rotor 110 falls below a second rotation speed threshold, the thruster 100 can actuate the actuator 905 to adjust the pitch of the rotor blades 115 to be less coarse, for instance by having the actuator 905 move the annular wheel assembly 910 along the tracks 920 to pull the annular rotor control mechanism 410 along the tracks 420 away from the rotor blade base leverage elements 415, allowing the rotor blade bases 215 and the rotor blades 115 to rotate back. In some examples, the rotor blade bases 215 may include a detent mechanism, such as a spring, a rubber band, or a magnetic assembly, that can resist and/or arrest the movement of the rotor blade bases form the push on the rotor blade base leverage elements 415, and/or that can exert a force (e.g., in an opposite direction as the annular rotor control mechanism 410) to cause the rotor blade bases 215 to return to their initial position once the annular rotor control mechanism 410 no longer pushes on the rotor blade base leverage elements 415. In some examples, the flow 125 can push on the rotor blades 115 in a way that can cause the rotor blade bases 215 to return to their initial position once the annular rotor control mechanism 410 no longer pushes on the rotor blade base leverage elements 415.

Figure 10:
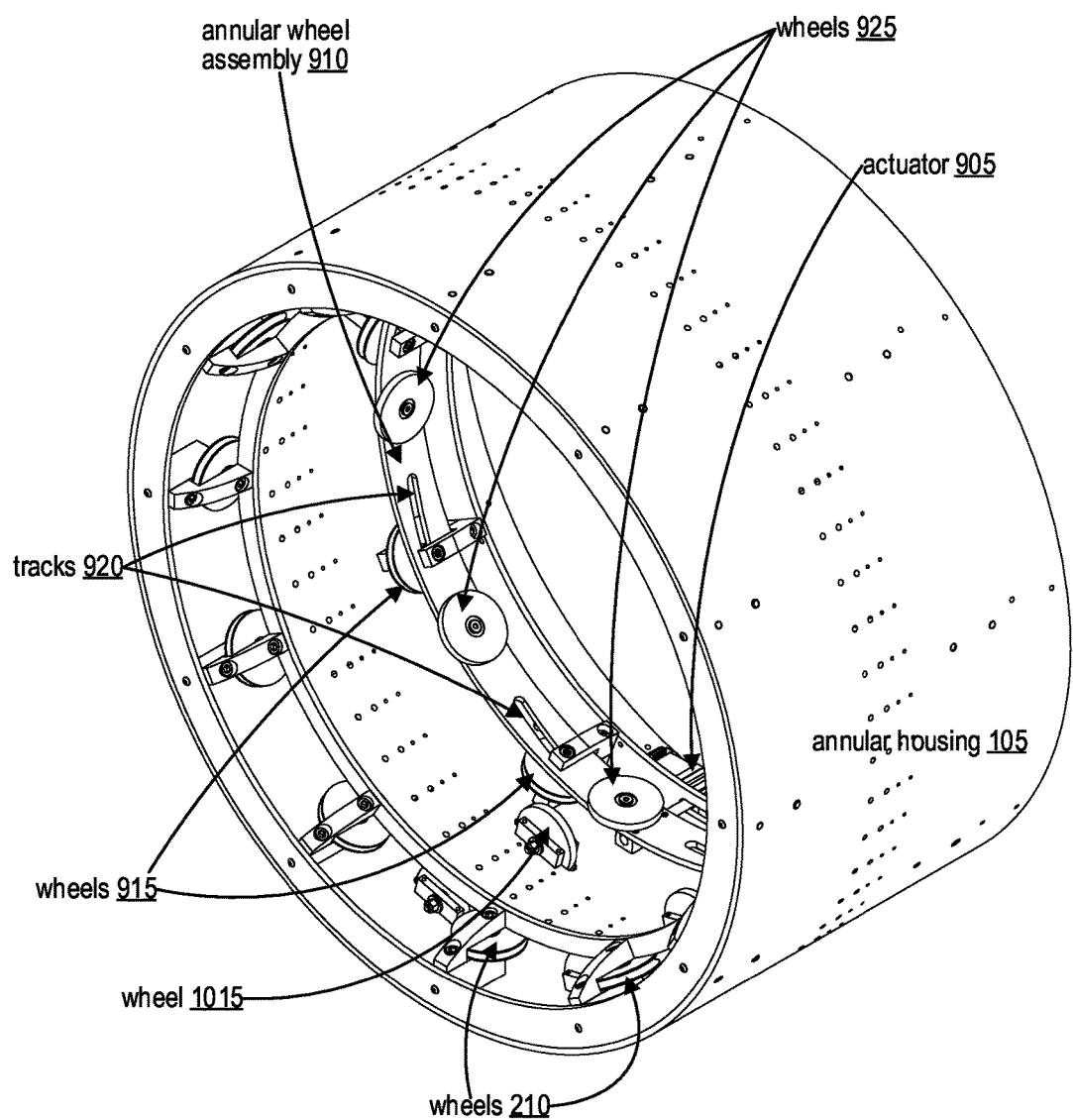
FIG. 10 is a perspective diagram illustrating the annular housing with the actuator, the annular wheel assembly, and wheels for preventing lateral movement in the annular rotor, in accordance with some examples.

FIG. 10 is a perspective diagram 1000 illustrating the annular housing 105 with the actuator 905, the annular wheel assembly 910, and wheels (e.g., wheels 210 and wheels 915) for preventing lateral movement in the annular rotor 110. In particular, the perspective diagram 1000 illustrates the annular housing 105, the wheels 210, the wheels 915, the annular wheel assembly 910 with the wheels 925 and the tracks 920, and the actuator 905. The perspective diagram 1000 also illustrates a wheel 1015. In some examples, the annular housing 105 may include wheels oriented as in the wheel 1015, to keep the exterior surface of the annular rotor 110 at least a distance (e.g., at least the radius of the wheel 1015) away from the interior surface of the annular housing 105.

Figure 11:
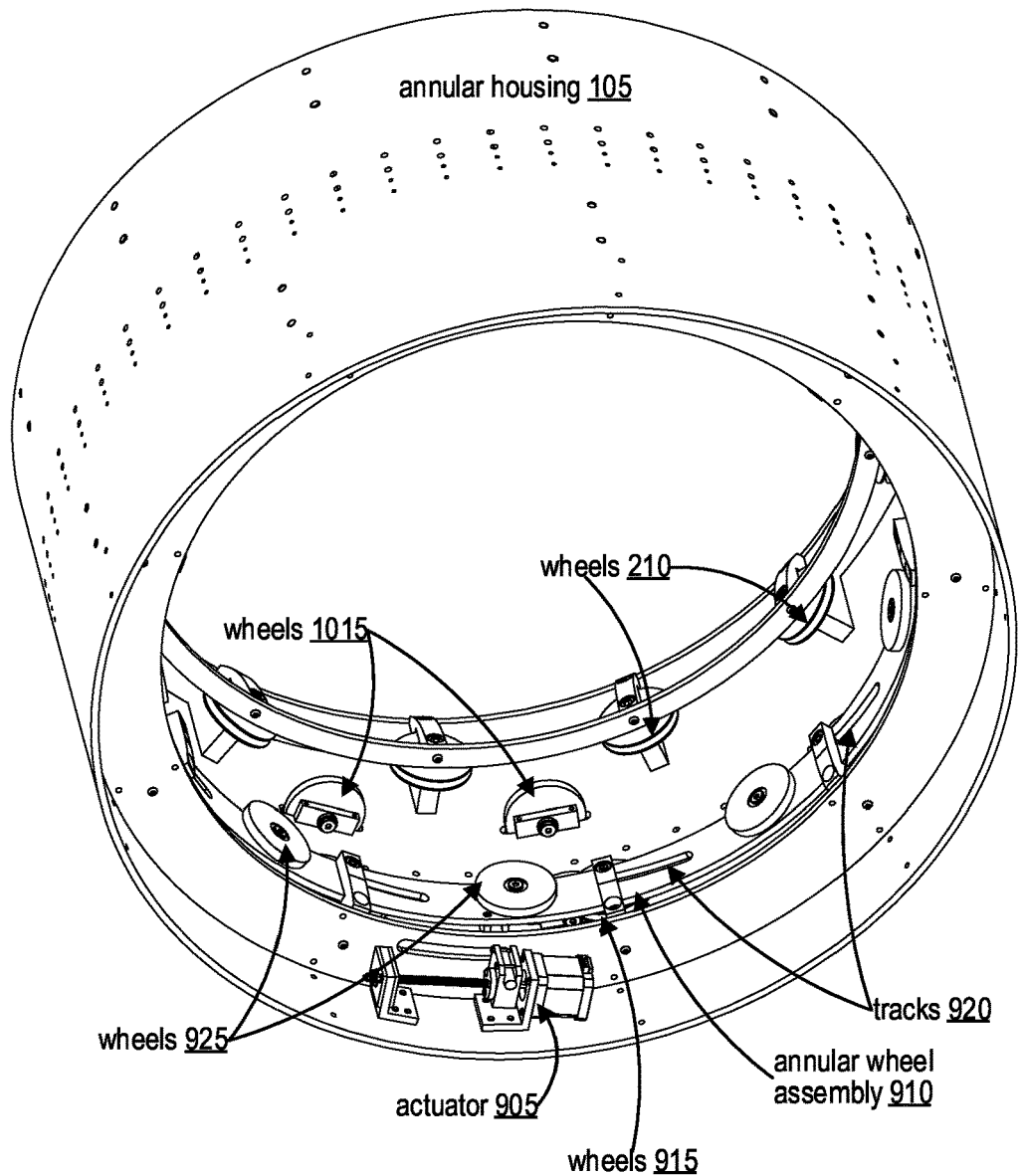
FIG. 11 is a second perspective diagram illustrating the annular housing with the actuator, the annular wheel assembly, and wheels for preventing lateral movement in the annular rotor, in accordance with some examples.

FIG. 11 is a second perspective diagram 1100 illustrating the annular housing 105 with the actuator 905, the annular wheel assembly 910, and wheels (e.g., wheels 210 and wheels 915) for preventing lateral movement in the annular rotor 110. In particular, the perspective diagram 1000 illustrates the annular housing 105, the wheels 210, the wheels 915, the annular wheel assembly 910 with the wheels 925 and the tracks 920, the actuator 905, and the wheels 1015.

Figure 12:
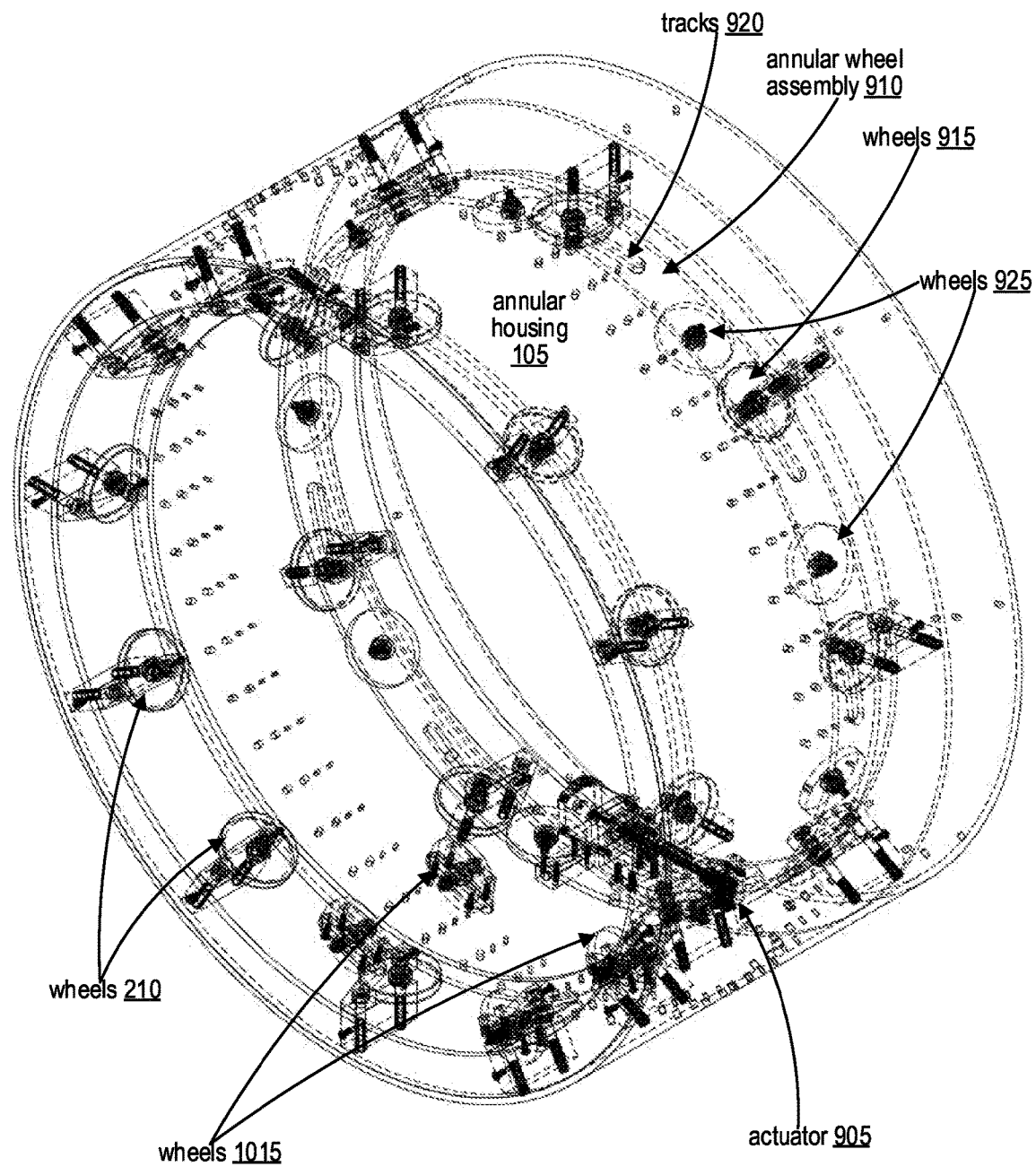
FIG. 12 is a third perspective diagram illustrating the annular housing with the actuator, the annular wheel assembly, and wheels for preventing lateral movement in the annular rotor, in accordance with some examples.

FIG. 12 is a third perspective diagram 1200 illustrating the annular housing 105 with the actuator 905, the annular wheel assembly 910, and wheels (e.g., wheels 210 and wheels 915) for preventing lateral movement in the annular rotor 110. In particular, the perspective diagram 1000 illustrates the annular housing 105, the wheels 210, the wheels 915, the annular wheel assembly 910 with the wheels 925 and the tracks 920, the actuator 905, and the wheels 1015.

Figure 13B:
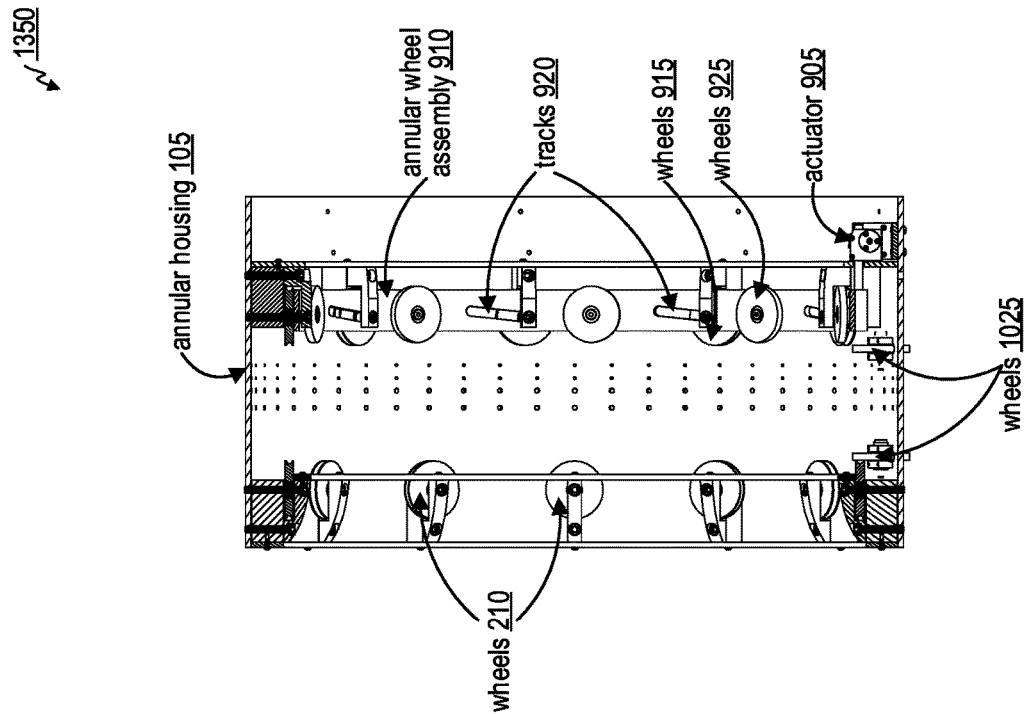
FIG. 13B is an orthogonal cutaway view diagram illustrating the annular housing from a side of the thruster with the actuator, the annular wheel assembly, and wheels for preventing lateral movement in the annular rotor, in accordance with some examples.
Figure 13A:
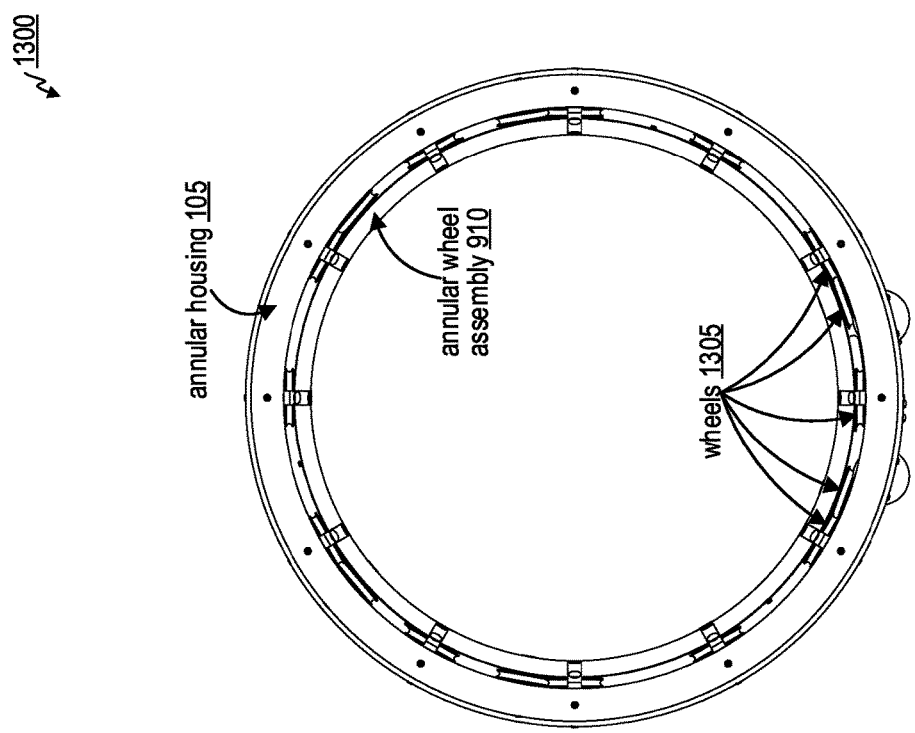
FIG. 13A is an orthogonal view diagram illustrating the annular housing from the front of the thruster with the annular wheel assembly and wheels, in accordance with some examples.

FIG. 13A is an orthogonal view diagram 1300 illustrating the annular housing 105 from the front of the thruster with the annular wheel assembly 910 and wheels 1305. The wheels 1305 can include wheels 210, wheels 915, and/or wheels 925.

FIG. 13B is an orthogonal cutaway view diagram 1350 illustrating the annular housing 105 with the actuator 905, the annular wheel assembly 910, and wheels (e.g., wheels 210 and wheels 915) for preventing lateral movement in the annular rotor 110. In particular, the orthogonal cutaway view diagram 1350 illustrates the annular housing 105, the wheels 210, the wheels 915, the annular wheel assembly 910 with the wheels 925 and the tracks 920, the actuator 905, and the wheels 1015. In particular, the orthogonal cutaway view diagram 1350 illustrates the annular housing 105, the wheels 210, the wheels 915, the annular wheel assembly 910 with the wheels 925 and the tracks 920, the actuator 905, and the wheels 1015.

Figure 14:
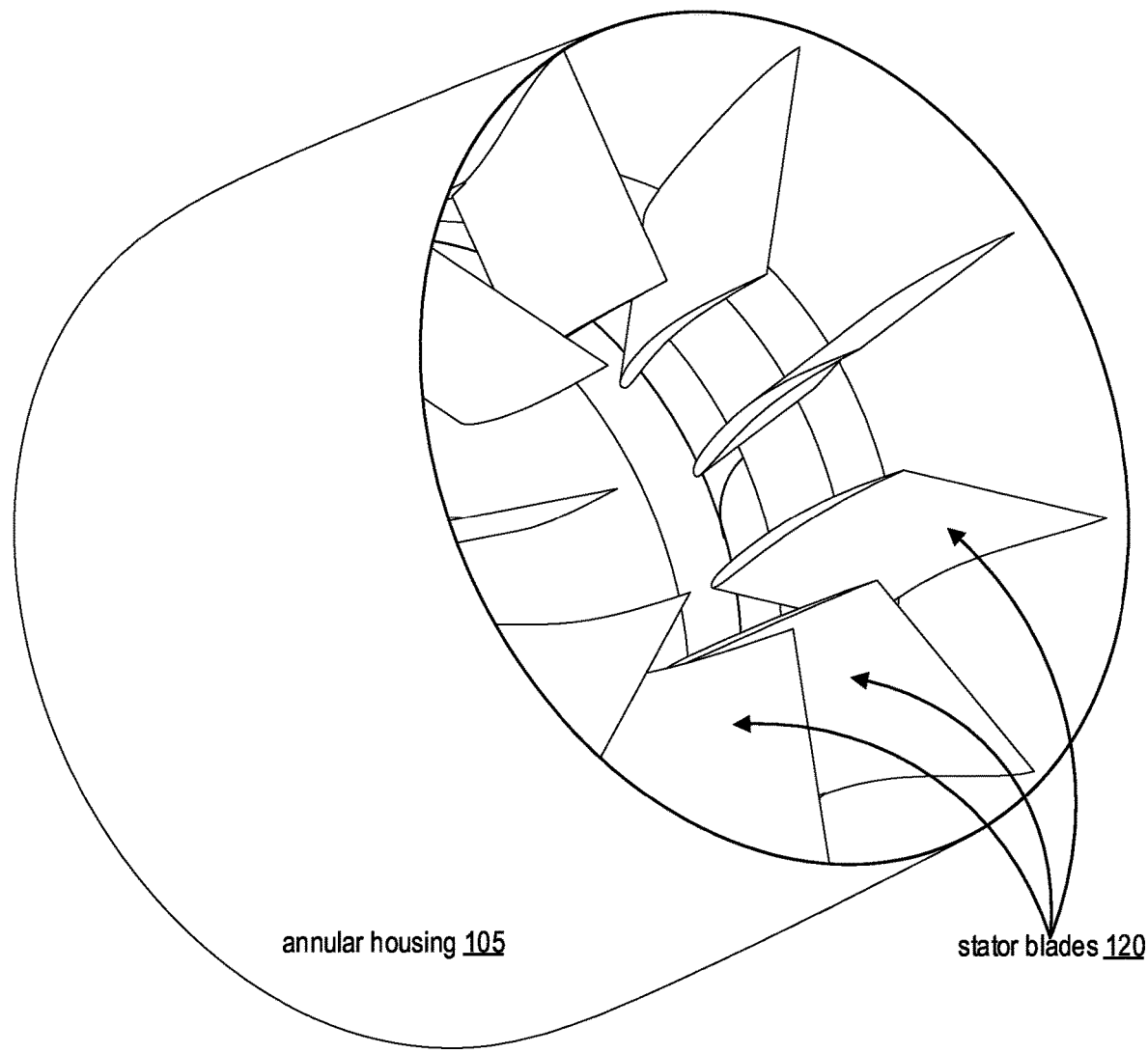
FIG. 14 is a perspective diagram illustrating a rear of the annular housing with the stator blades and a cowling, in accordance with some examples.

FIG. 14 is a perspective diagram 1400 illustrating a rear of the annular housing 105 with the stator blades 120 and a cowling. In particular, the perspective diagram 1400 illustrates nine stator blades 120. It should be understood that the thruster may include more or fewer than nine stator blades 120. The rear of the annular housing 105 is shaped to form an aerodynamic cowling to reduce drag and/or to keep the thruster 100 cool.

In some examples, the stator blades 120 of the thruster 100 may also include an adjustable pitch, and the thruster 100 may adjust the pitch of the stator blades 120 under any of the conditions discussed above with regard to adjusting the pitch of the rotor blades 115. For instance, the stator blades 120 may be coupled to the annular housing 105 using stator blade bases similar to the rotor blade bases 215. The thruster may include a third actuator similar to the actuator 905, which may push an assembly that may include a second annular wheel assembly (similar to the annular wheel assembly 910), a second annular rotor control mechanism (similar to the annular rotor control mechanism 410), or a combination thereof, which may push stator blade base leverage elements (similar to the rotor blade base leverage elements) to rotate the stator blades 120 about respective stator blade rotation axes (similar to the rotation axis 710). The stator blade rotation axes may be axes running from a fastener that couples the stator blade bases to the annular housing 105 (similar to the fastener 705) to the central axis 130.

Figure 15:
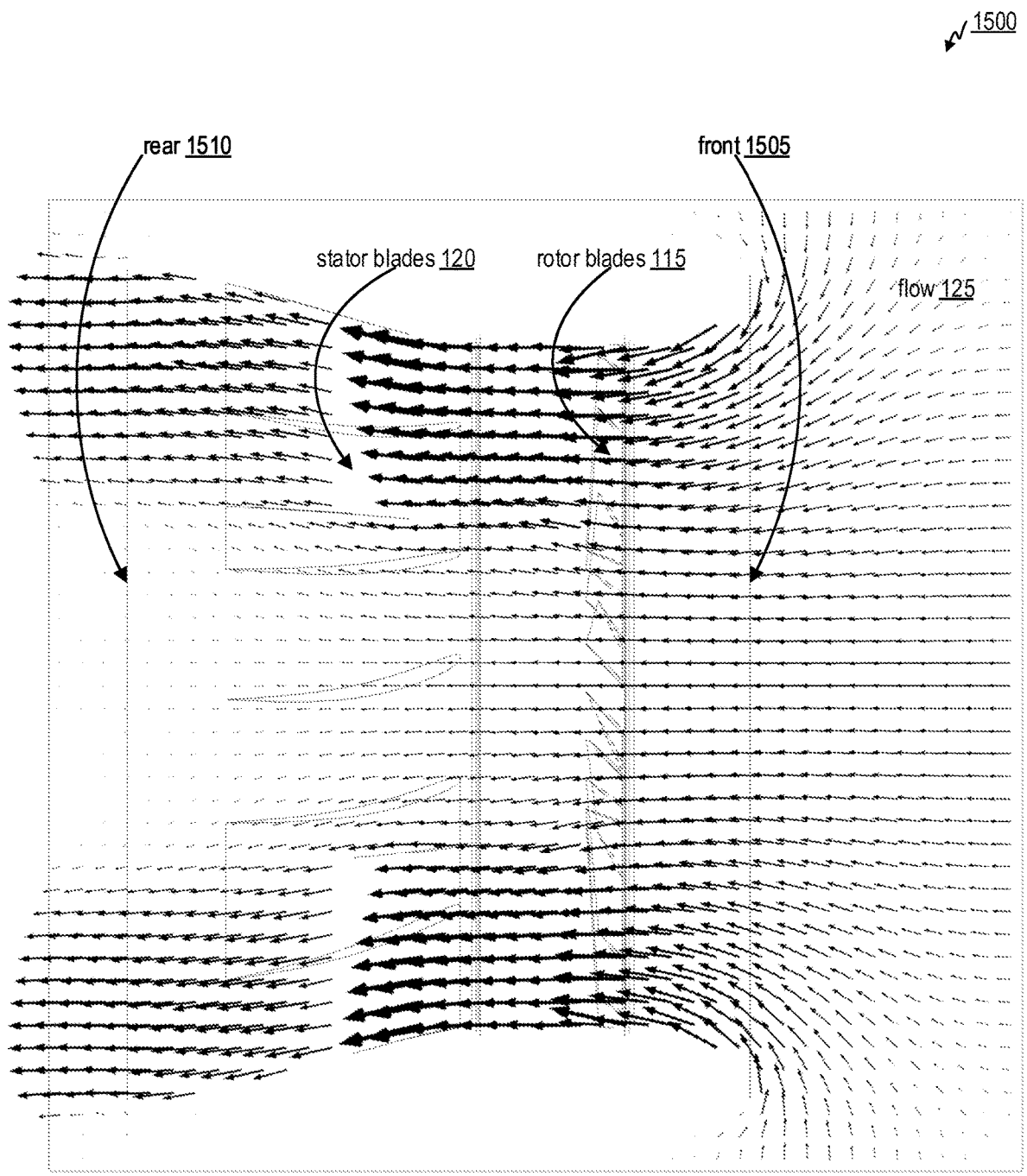
FIG. 15 is an orthogonal view diagram illustrating a flow passing from a front of the thruster, along the rotor blades and the stator blades, and exiting out of the rear of the thruster to produce thrust, in accordance with some examples.

FIG. 15 is an orthogonal view diagram 1500 illustrating a flow 125 passing from a front 1505 of the thruster 100, along the rotor blades 115 and the stator blades 120, and exiting out of the rear 1510 of the thruster 100 to produce thrust. In the orthogonal view diagram 1500, the flow 125 is illustrated as a series of arrows, with longer and thicker arrows indicating faster speeds (e.g., airspeeds) and lower pressures (per Bernoulli's principle) of the flow 125, and with shorter and thinner arrows indicating slower speeds (e.g., airspeeds) and higher pressures (per Bernoulli's principle) of the flow 125. As is visible in the orthogonal view diagram 1500, the rotor blades 115 increase the speed and the pressure of the flow 125. The stator blades 120 take advantage of this increased speed and pressure, and are able to convert some of this increased speed and pressure into further thrust, without the thruster 100 having to rotate or otherwise provide power to the stator blades 120.

In some examples, the portion of the flow 125 that is not in direct contact with the rotor blades 115 becomes entrained by the change in the pressure caused by the rotation and compression effect of the rotor blades 115. The airfoil shape of the stator blades 120 can convert the energy from the entrained flow 125 into additional thrust. The suction side of the stator blades 120 are exposed to the high-pressure side of the rotor blades, which advantageously allows additional thrust to be imparted into the thruster assembly while reducing the rotational component of the accelerated flow 125, directing the force of the flow 125 to be predominantly along the direction of travel for the thruster 100.

The stator blades 120 are illustrated herein in an airfoil shape, and are angled downward relative to the incoming flow, allowing the stator blades 120 to generate additional thrust. In some examples, the rotor blades 115 turn in a counter-clockwise direction, causing the flow 125 coming from the rotor blades 115 to be spinning in the counter-clockwise direction. The leading edges of the stator blades 120 can be arranged to catch air that spins in the counter-clockwise direction from the rotor blades 115, so that flow 125 moving around the stator blades 120 moves more slowly along the pressure side of the airfoil than along the suction side of the airfoil, producing lift at the airfoil that translates into thrust for the thruster 100. The airfoil shape of the stator blades 120 can also reduce the counter-clockwise spin of the flow 125 in the process, directing the flow 125 in a direction closer to a direction that is parallel to the central axis 130.

In some examples, the thruster 100 may have multiple rows of rotor blades 115, each of which may have adjustable pitch as discussed herein. In some examples, the thruster 100 may have multiple rows of stator blades 120, each of which may have adjustable pitch as discussed herein. In some examples, the stator blades 120 may be missing from the thruster 100. In some examples, the thruster 100 may have any arrangement of rows of rotor blades 115 and rows of stator blades 120. For instance, in a first illustrative example, from front to rear, the thruster 100 may include a first row of rotor blades 115, a second row of rotor blades 115, and a row of stator blades 120. In a second illustrative example, from front to rear, the thruster 100 may include a first row of rotor blades 115, a first row of stator blades 120, a second row of rotor blades 115, and a second row of stator blades 120. In a third illustrative example, from front to rear, the thruster 100 may include a first row of stator blades 120, a first row of rotor blades 115, a second row of stator blades 120, a second row of rotor blades 115, and a third row of stator blades 120. In a fourth illustrative example, from front to rear, the thruster 100 may include a first row of rotor blades 115, a first row of stator blades 120, and a second row of rotor blades 115. Different arrangements of rows of rotor blades 115 and stator blades 120 can be used with the thruster 100.

In some examples, the thruster 100 described herein can provide significant improvements over other thrusters. In some examples, the structural configuration of the thruster 100 allows the portion of the incoming flow 125 that is not in direct contact with the rotor blades 115 to become entrained by the change in the pressure caused by the rotation and compression effect of the rotor blades 115. The energy from the entrained airstream is converted into additional thrust by the stator blades 120. The stator blades are exposed to the high-pressure side of the rotor blades, which advantageously allows additional thrust to be imparted into the thruster assembly while reducing the rotational component of the accelerated airstream such that the force is predominantly along the direction of travel.

The arrangement of the rotor blades 115 along the annular rotor 110 as described herein allows the rotor blades 115 to be coupled to the annular rotor 110, which advantageously includes structure elements (e.g., the actuator 905, the annular wheel assembly 910, and the annular rotor control mechanism 410) that allow the relative angle of the rotor blades 115 to be varied such that the thruster 100 can be optimized for a wide range of forward velocities (from static velocity various increasingly higher velocity thresholds) by maintaining an angle of attack that provides high thrust despite varying inlet velocity conditions.

The annular rotor 110 can be actuated using various actuator(s) and/or electromagnetic machines (motors) such as radial actuators, axial actuators, or a combination thereof. The actuator(s) can include of radial and axial moving permanent magnets, and/or can be induction driven, to provide mechanical torque when exposed to a rotating magnetic field (RMF) (e.g., as provided by the electromagnetic coils 305). The components of the thruster 110 can be arranged into an annular, circular, or otherwise rounded aerodynamic shape to further enhance the generated thrust generated by the thruster 100, and to provide a straightforward path for extraction of any waste heat products created by the rotation of the annular rotor 110. The thruster 100 can include any number of rotor blades 115 and/or stator blades 120.

At each row or stage of blades, the rotor blades 115 and/or stator blades 120 can have variable pitch as described herein, providing an adjustable angle of attack, a rotational velocity, and/or direction of rotation. The rotation of the rotor blades 115 and/or stator blades 120 to change the pitch of the rotor blades 115 and/or stator blades 120 can be independent of the rotation of the annular rotor 110, for instance driven by a separate actuator (e.g., actuator 905). In some examples, the rotation of the rotor blades 115 and/or stator blades 120 to change the pitch of the rotor blades 115 and/or stator blades 120 can be configured to be performed cooperatively with the rotation of the annular rotor 110, for instance to rotate of the rotor blades 115 and/or stator blades 120 to change the pitch of the rotor blades 115 and/or stator blades 120 based on the rotation speed of the annular rotor 110.

For instance, in tests, the thruster 100 described herein uses approximately ⅓ of the power (in Watts) to provide the same amount of thrust over time compared to a propeller-based thruster. Using that power, the thruster 100 described herein can safely achieve higher rotation speeds (e.g., 5600 rotations per minute (RPM)) compared to rotations speeds of 2800 RPM for the propeller-based thruster. Because higher rotational speeds have the ability to move air more quickly and given that thrust generated is proportional to the square of the speed of the air, this further increases the efficiency of the thrusters described herein over a propeller-based thruster. The propeller-based thruster uses lower rotation speeds because the propeller-based thruster must be cautious not to exceed blade tip speeds that might cause cavitation or a sonic boom. When rotor blade tips reach supersonic speeds, the turbulence of the flow 125 increases dramatically, and performance drops accordingly, with much of the power input into such a thruster being converted into noise rather than thrust. Thrusters with rotor blades whose tips reach supersonic speeds are also increasingly subject to failure at supersonic speeds. The thruster 100 described herein effectively avoids cavitation and/or sonic booms at blade tips (and corresponding increases in turbulence, drops in performance, and increases in failure risk) because the tips of the rotor blades 115 are closer to the central axis 130 of the thruster 100 and therefore effectively move more slowly than the rotor blade bases 215 relative to the annular housing 105. Even so, the propeller-based thruster reaches potentially dangerous blade tip speeds of over 300 m/sec, while the thruster 100 described herein reaches much safer blade tip speeds of less than 200 m/sec. The thruster 100 described herein includes safer pressures within the thruster 100 (e.g., less than 1000 newtons (N)) than the propeller-based thruster (e.g., over 3000 N). The thruster 100 described herein ultimately produces more thrust (e.g., over 3500 N) than the propeller-based thruster (e.g., less than 1000 N). Further, the forces on the rotor blades 115 in the thruster 100 (e.g., and in particular, attachment points of the rotor blades 115) can be reduced compared to propeller-based thruster based on relative reduction of arm length(s) of the rotor blades 115, improving safety and allowing the thruster 100 to be manufactured using less intensive manufacturing techniques, such as composite layup, stamping, subtractive machining, extrusion and post-extrusion forming processes, or combinations thereof.

Figure 16:
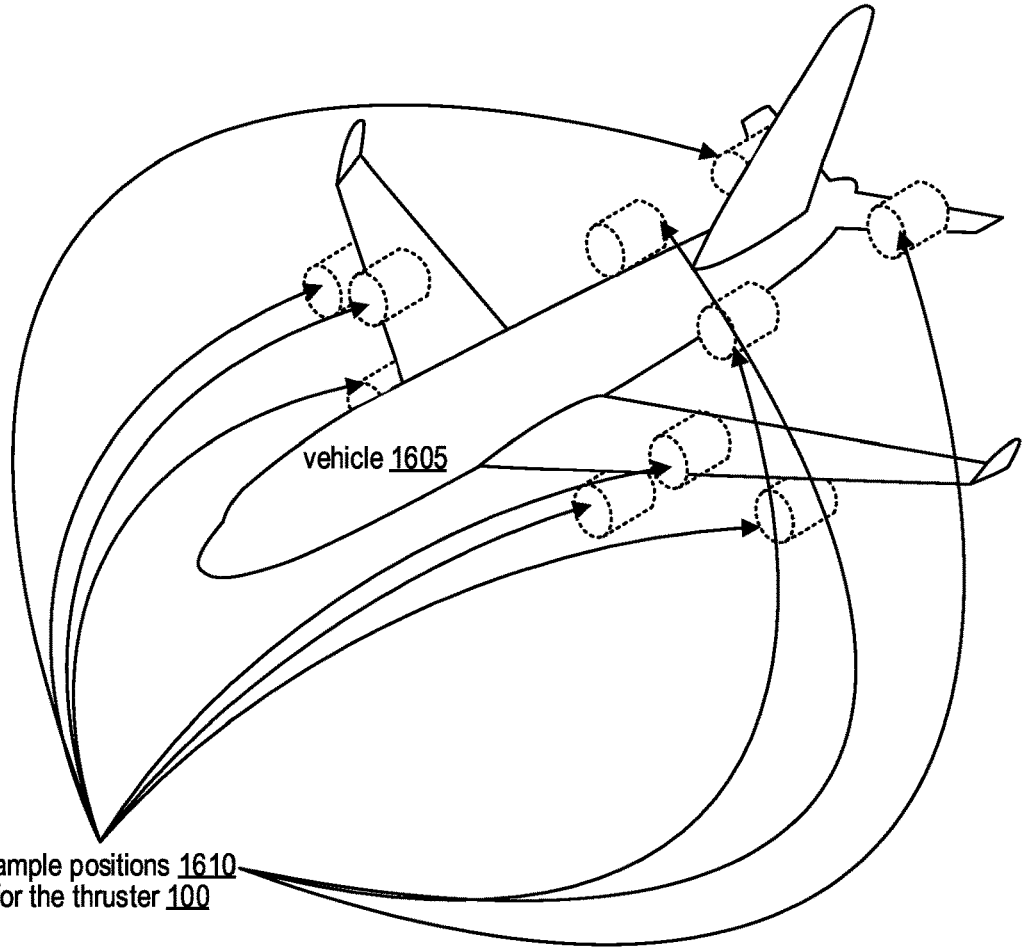
FIG. 16 is a perspective diagram illustrating an example of a vehicle, with example positions at which the thruster can be coupled to the vehicle, in accordance with some examples.

FIG. 16 is a perspective diagram illustrating an example of a vehicle 1605, with example positions 1610 at which the thruster 100 can be coupled to the vehicle 1605. The vehicle 1605 is illustrated as an aircraft, and in particular an airplane. The example positions 1610 include example positions 1610 under the wings of the vehicle 1605, over the wings of the vehicle 1605, along the sides of the vehicle 1605, along the tail of the vehicle 1605, or combinations thereof. In some examples, other positions may be possible for the thruster 100, such as on or along the nose of the vehicle 1605, on or along the rear of the vehicle 1605, or other positions. In some examples, the vehicle 1605 may have a different shape, and additional positions for the thruster 100 may be available depending on the shape of the vehicle 1605.

While the thruster 100 at all of the example positions 1610 is illustrated as oriented in a first direction to provide thrust toward the rear of the vehicle 1605 and thereby propel the vehicle 1605 forward, it should be understood that the thruster 100 may be coupled to the vehicle 1605 in a different orientation. For instance, in a vehicle 1605 capable of vertical takeoff and landing (VTOL), the thruster 100 may be oriented to provide thrust downward and to therefore propel the vehicle 1605 upward. In some examples, the vehicle 1605 may use the thruster 100 in place of helicopter-style propellers.

While the vehicle 1605 is illustrated as an airplane, it should be understood that the vehicle 1605 may instead be a helicopter, an unmanned aerial vehicle (UAV), an autonomous aerial vehicle (AAV), a drone, another type of aircraft, an automobile, a train, a trolley, a bus, a truck, a motorcycle, a motorbike, a scooter, an unmanned ground vehicle (UGV), an autonomous ground vehicle (AGV), another type of ground vehicle, a boat, a submarine, a personal watercraft, a water scooter, an unmanned surface vehicle (USV), an unmanned underwater vehicle (UUV), an autonomous surface vehicle (ASV), an autonomous underwater vehicle (AUV), another type of watercraft, a hovercraft, a spacecraft, a rocket, a space shuttle, a lander, an unmanned space vehicle (USV), an autonomous space vehicle (ASV), another type of spacecraft, an unmanned vehicle, a manned vehicle, an autonomous vehicle, an manually operated vehicle, another type of vehicle, or a combination thereof.

Figures 17A, 17B:
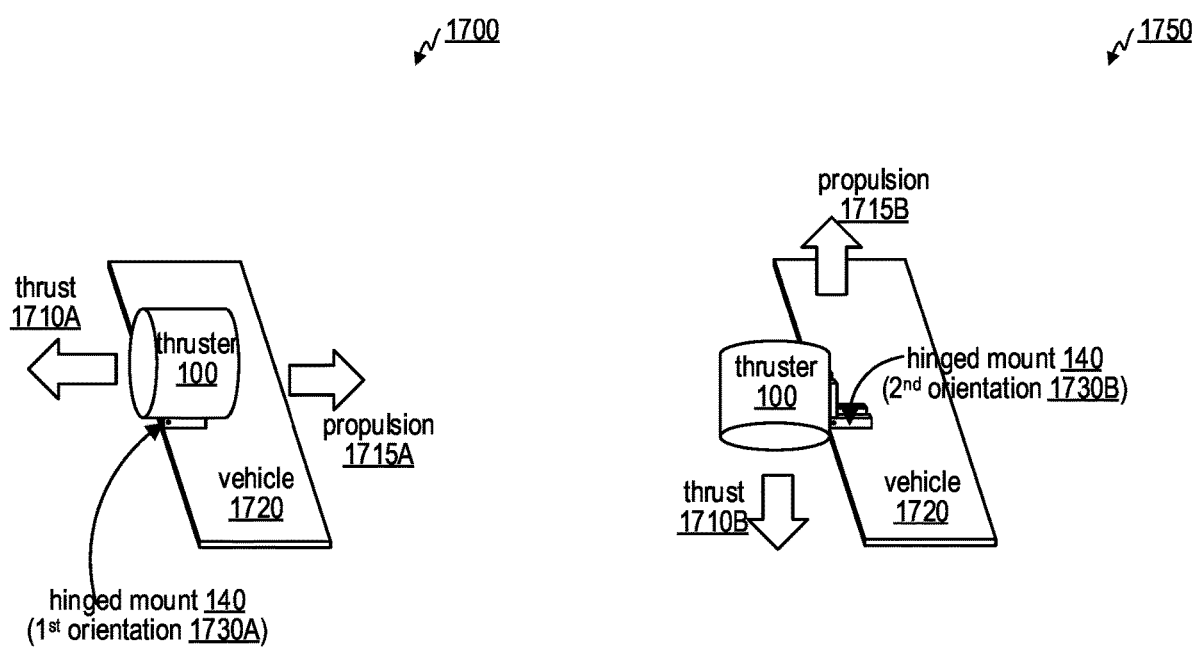
FIG. 17A is a perspective diagram illustrating the thruster coupled to a vehicle using a hinged mount that is arranged in a first orientation so that the thruster provides thrust in a first thrust direction and provides propulsion in a first propulsion direction, in accordance with some examples.
FIG. 17B is a perspective diagram illustrating the thruster coupled to a vehicle using a hinged mount that is arranged in a second orientation so that the thruster provides thrust in a second thrust direction and provides propulsion in a second propulsion direction, in accordance with some examples.

FIG. 17A is a perspective diagram illustrating the thruster 100 coupled to a vehicle 1720 using a hinged mount 140 that is arranged in a first orientation 1730A so that the thruster 100 provides thrust in a first thrust direction 1710A and provides propulsion in a first propulsion direction 1715A. The vehicle 1720 is illustrated as a rectangular surface, which may be a portion of a wing or tail of the vehicle 1605, or another portion of another vehicle, such as any of the types of vehicles listed above. In the first orientation 1730A, the hinged mount 140 is folded over itself, so that the first thrust direction 1710A that the thruster 100 provides thrust in is parallel to the surface of the vehicle 1720, and the first propulsion direction 1715A that the thruster 100 provides propulsion in is also parallel to the surface of the vehicle 1720. For instance, if the rectangular surface of the vehicle 1720 represents a portion of a wing, then in the first orientation 1730A, the first thrust direction 1710A is lateral, and the first propulsion direction 1715A is also lateral, as in the example positions 1610 for the thruster 100 illustrated in FIG. 16.

FIG. 17B is a perspective diagram illustrating the thruster 100 coupled to a vehicle 1720 using a hinged mount 140 that is arranged in a second orientation 1730B so that the thruster 100 provides thrust in a second thrust direction 1710B and provides propulsion in a second propulsion direction 1715B. In the second orientation 1730B, the hinged mount 140 is unfolded at an approximately 90 degree angle, so that the second thrust direction 1710B that the thruster 100 provides thrust in is orthogonal to the surface of the vehicle 1720, and the second propulsion direction 1715B that the thruster 100 provides propulsion in is also orthogonal to the surface of the vehicle 1720. For instance, if the rectangular surface of the vehicle 1720 represents a portion of a wing, then in the second orientation 1730B, the second thrust direction 1710B is down, and the second propulsion direction 1715B is up, which may for instance allow the thruster 100 to provide downward thrust and vertical propulsion for VTOL.

FIG. 18 is a flow diagram illustrating exemplary operations for a process 1800 for flow control. The process 1800 may be referred to as a method for flow control. The process 1800 may be performed by a flow control system. In some examples, the flow control system can include, for instance, the thruster 100, the annular housing 105, the annular rotor 110, the rotor blades 115, the stator blades 120, the hinged mount 140, the rotor blade bases 215, the wheels 210, the electromagnetic coils 305, the mounts 310, the magnets 405, the annular rotor control mechanism 410, the rotor blade base leverage elements 415, the tracks 420, the rotor blade 605, the rotor blade base 610, the rotor blade platform 615, the rotor blade base leverage element 620, the fastener 705, the fasteners 715, the gap 805, the actuator 905, the annular wheel assembly 910, the wheels 915, the tracks 920, the wheels 925, the wheels 1015, the wheels 1305, the front 1505, the rear 1510, the vehicle 1605, the vehicle 1720, computing system 1900, the processor 1910, an apparatus for flow control, a non-transitory computer-readable storage medium storing instructions that perform the process 1800 when executed by a processor such as the processor 1910, other components described herein, substitutes for any of these components, sub-components of any of these components, or a combination thereof.

At operation 1805, the flow control system is configured to, and can, actuate a first actuator. The first actuator is configured to rotate an annular rotor (e.g., annular rotor 110) about a central axis (e.g., central axis 130) relative to an annular housing (e.g., annular housing 105). Rotation of the annular rotor about the central axis relative to the annular housing is configured to rotate a plurality of rotor blades (e.g., rotor blades 115, rotor blade 605) about the central axis relative to the annular housing. Respective bases (e.g., rotor blade bases 215, rotor blade base 610) of the plurality of rotor blades are coupled to the annular rotor. Respective tips of the plurality of rotor blades are directed toward the central axis. Examples of the first actuator include the electromagnetic coils 305 of the annular housing that can interact with the magnets 405 of the annular rotor to rotate the annular rotor about the central axis relative to the annular housing, actuated wheels of the annular housing that can interact with the annular rotor to rotate the annular rotor about the central axis relative to the annular housing, or combinations thereof.

In some examples, the first actuator includes at least one electromagnet (e.g., the electromagnetic coils 305) coupled to the annular housing, and the first actuator is configured to rotate the annular rotor about the central axis relative to the annular housing by activating the at least one electromagnet to produce a magnetic effect on at least one portion of the annular rotor. In some examples, the at least one portion of the annular rotor includes at least one of a magnet (e.g., the magnets 405) or a ferromagnetic material.

At operation 1815, the flow control system is configured to, and can, actuate a second actuator (e.g., actuator 905). The second actuator is configured to rotate the plurality of rotor blades relative to the annular rotor. Actuation of the second actuator rotates a rotor blade about a rotor blade axis (e.g., rotation axis 710). The rotor blade axis extends from a base of the rotor blade toward the central axis (e.g., from the fastener 705 at the rotor blade base 610 to the central axis 130).

In some examples, the base of the rotor blade is coupled to the annular rotor using a fastener (e.g., fastener 705), and the rotor blade axis (e.g., the rotation axis 710) extends from a position of the fastener at the base of the rotor blade.

In some examples, the second actuator is configured to rotate the plurality of rotor blades relative to the annular rotor from a first rotor blade rotation configuration to a second rotor blade rotation configuration. The second rotor blade rotation configuration is associated with a higher torque than the first rotor blade rotation configuration.

In some examples, the flow control system includes an annular rotor control mechanism (e.g., annular rotor control mechanism 410) within the annular rotor. The second actuator is configured to move the annular rotor control mechanism translationally relative to the annular rotor (e.g., along the central axis 130). Movement of the annular rotor control mechanism translationally relative to the annular rotor is configured to push on portions (e.g., rotor blade base leverage elements 415) of the respective bases of the plurality of rotor blades to rotate the plurality of rotor blades relative to the annular rotor. In some examples, the annular rotor control mechanism moves along tracks (e.g., tracks 420). In some examples, the flow control system includes an annular wheel assembly (e.g., annular wheel assembly 910). The second actuator is configured to move the annular wheel assembly translationally relative to the annular rotor (e.g., along the central axis 130), with the annular wheel assembly in turn pushing the annular rotor control mechanism. Movement of the annular wheel assembly and/or the annular rotor control mechanism translationally relative to the annular rotor is configured to cause the annular rotor control mechanism to push on portions (e.g., rotor blade base leverage elements 415) of the respective bases of the plurality of rotor blades to rotate the plurality of rotor blades relative to the annular rotor.

In some examples, the flow control system includes a sensor that is configured to monitor a rotational speed of the annular rotor about the central axis relative to the annular housing. The second actuator is configured to rotate the plurality of rotor blades relative to the annular rotor based on the rotational speed. For instance, if the rotation speed sensors indicate that the rotation speed of the annular rotor 110 exceeds a first rotation speed threshold, the flow control system can actuate the second actuator to adjust the pitch of the rotor blades 115 to be more coarse, for instance by having the second actuator move the annular wheel assembly 910 along the tracks 920 to push the annular rotor control mechanism 410 along the tracks 420 to push the rotor blade base leverage elements 415 to rotate the rotor blade bases 215 and the rotor blades 115. If the rotation speed sensors indicate that the rotation speed of the annular rotor 110 falls below a second rotation speed threshold, the flow control system can actuate the second actuator to adjust the pitch of the rotor blades 115 to be less coarse, for instance by having the second actuator move the annular wheel assembly 910 along the tracks 920 to pull the annular rotor control mechanism 410 along the tracks 420 away from the rotor blade base leverage elements 415, allowing the rotor blade bases 215 and the rotor blades 115 to rotate back.

In some examples, the flow control system can actuate the second actuator to adjust the pitch of the rotor blades 115 using the second actuator based on various metrics and/or heuristics, such as a rotation speed and/or rotation velocity (e.g., in rotations per minute (rpm) or rotations per second (rps)) of the annular rotor 110 about the central axis 130 relative to the annular housing 105 reaching or exceeding or falling below or otherwise crossing a predetermined rotation speed threshold and/or rotation velocity threshold, a speed of the flow 125 through the flow control system reaching or exceeding or falling below or otherwise crossing a predetermined flow speed threshold, a force from the flow 125 on the rotor blades 115 reaching or exceeding or falling below or otherwise crossing a predetermined force threshold, a force from the flow 125 on the stator blades 120 reaching or exceeding or falling below or otherwise crossing a predetermined force threshold, a temperature of the flow 125 reaching or exceeding or falling below or otherwise crossing a predetermined flow temperature threshold, a temperature of at least a portion of the flow control system reaching or exceeding or falling below or otherwise crossing a predetermined thruster temperature threshold, a speed and/or velocity of the flow control system reaching or exceeding or falling below or otherwise crossing a predetermined thruster speed threshold and/or thruster velocity threshold, an acceleration of the flow control system reaching or exceeding or falling below or otherwise crossing a predetermined thruster acceleration threshold, a pressure of the flow 125 (e.g., air pressure or water pressure) reaching or exceeding or falling below or otherwise crossing a predetermined flow pressure threshold, an altitude of the flow control system reaching or exceeding or falling below or otherwise crossing a predetermined altitude threshold, a location of the flow control system (e.g., latitude and/or longitude) reaching a predetermined area, an orientation of the flow control system (e.g., pitch, roll, and/or yaw) reaching or exceeding or falling below or otherwise crossing a predetermined orientation threshold, a maneuver being performed (or to be performed) by a vehicle that includes the flow control system, or a combination thereof.

In some examples, respective lengths of the plurality of rotor blades are less than a radius of the annular rotor. The radius of the annular rotor may be measured from the annular rotor (e.g., an interior surface of the annular rotor) to the central axis.

In some examples, the flow control system includes a plurality of stator blades (e.g., stator blades 120) coupled to the annular housing. A fluid flow (e.g., flow 125) passing through the annular housing is configured to reach the plurality of stator blades after reaching the plurality of rotor blades.

In some examples, the flow control system is a thruster (e.g., thruster 100). The thruster is coupled to a vehicle (e.g., vehicle 1605, vehicle 1720), and the thruster is configured to provide thrust (e.g., first thrust direction 1710A, second thrust direction 1710B) to propel the vehicle (e.g., first propulsion direction 1715A, second propulsion direction 1715B).

In some examples, the thruster is coupled to the vehicle using a movable mounting mechanism (e.g., the hinged mount 140) that is configured to transition between a first orientation (e.g., first orientation 1730A) and a second orientation (e.g., second orientation 1730B). The thrust (e.g., first thrust direction 1710A) provided by the thruster propels the vehicle in a first direction (e.g., first propulsion direction 1715A) while the movable mounting mechanism is in the first orientation. The thrust (e.g., second thrust direction 1710B) provided by the thruster propels the vehicle in a second direction (e.g., second propulsion direction 1715B) while the movable mounting mechanism is in second orientation. In some examples, the vehicle is an aircraft.

In some examples, the flow control system includes a plurality of wheels coupled to the annular housing (e.g., the wheels 210, the wheels 915, the wheels 1015). The plurality of wheels are configured to prevent translational movement (e.g., along the central axis 130 or orthogonal to the central axis 130) of the annular rotor relative to the annular housing while the annular rotor rotates about the central axis relative to the annular housing. In some examples, the flow control system includes a plurality of electromagnets coupled to the annular housing (e.g., in place of the wheels 210, the wheels 915, and/or the wheels 1015). The plurality of electromagnets are configured to prevent translational movement of the annular rotor relative to the annular housing while the annular rotor rotates about the central axis relative to the annular housing.

Figure 19:
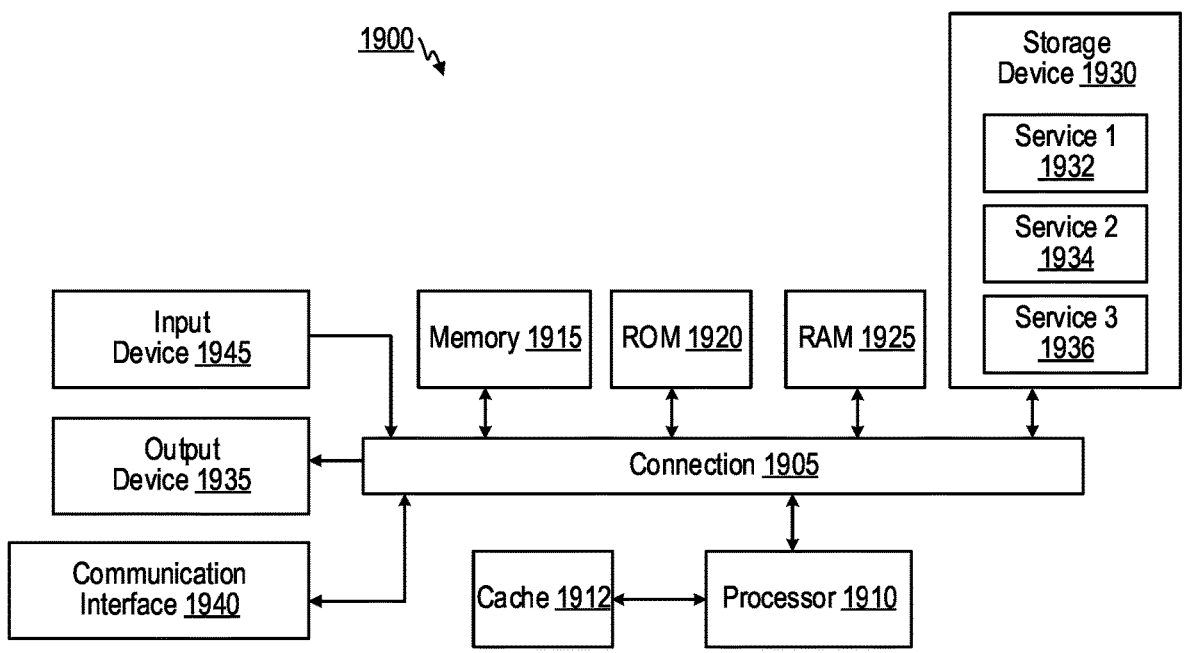
FIG. 19 is a block diagram of an exemplary computing device that may be used to implement some aspects of the technology.

FIG. 19 illustrates an exemplary computing system 1900 that may be used to implement some aspects of the technology. For example, any of the computing devices, computing systems, network devices, network systems, servers, and/or arrangements of circuitry described herein may include at least one computing system 1900, or may include at least one component of the computer system 1900 identified in FIG. 19. The computing system 1900 of FIG. 19 includes one or more processors 1910 and memory units 1920. Each of the processor(s) 1910 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1910 may include one or more cores, either integrated onto a single chip or spread across multiple chips connected or coupled together. Memory 1920 stores, in part, instructions and data for execution by processor 1910. Memory 1920 can store the executable code when in operation. The system 1900 of FIG. 19 further includes a mass storage device 1930, portable storage medium drive(s) 1940, output devices 1950, user input devices 1960, a graphics display 1970, and peripheral devices 1980.

The components shown in FIG. 19 are depicted as being connected via a single bus 1990. However, the components may be connected through one or more data transport means. For example, processor unit 1910 and memory 1920 may be connected via a local microprocessor bus, and the mass storage device 1930, peripheral device(s) 1980, portable storage device 1940, and display system 1970 may be connected via one or more input/output (I/O) buses.

Mass storage device 1930, which may be implemented with a magnetic disk drive or an optical disk drive, is a non-volatile storage device for storing data and instructions for use by processor unit 1910. Mass storage device 1930 can store the system software for implementing some aspects of the subject technology for purposes of loading that software into memory 1920.

Portable storage device 1940 operates in conjunction with a portable non-volatile storage medium, such as a floppy disk, compact disk or Digital video disc, to input and output data and code to and from the computer system 1900 of FIG. 19. The system software for implementing aspects of the subject technology may be stored on such a portable medium and input to the computer system 1900 via the portable storage device 1940.

The memory 1920, mass storage device 1930, or portable storage 1940 may in some cases store sensitive information, such as transaction information, health information, or cryptographic keys, and may in some cases encrypt or decrypt such information with the aid of the processor 1910. The memory 1920, mass storage device 1930, or portable storage 1940 may in some cases store, at least in part, instructions, executable code, or other data for execution or processing by the processor 1910.

Output devices 1950 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1970. The printer may be inkjet, laserjet, thermal, or some combination thereof. In some cases, the output device circuitry 1950 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1950 may include any ports, plugs, antennae, wired or wireless transmitters, wired or wireless transceivers, or any other components necessary for or usable to implement the communication types listed above, such as cellular Subscriber Identity Module (SIM) cards.

Input devices 1960 may include circuitry providing a portion of a user interface. Input devices 1960 may include an alpha-numeric keypad, such as a keyboard, for inputting alpha-numeric and other information, or a pointing device, such as a mouse, a trackball, stylus, or cursor direction keys. Input devices 1960 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1960 may include any ports, plugs, antennae, wired or wireless receivers, wired or wireless transceivers, or any other components necessary for or usable to implement the communication types listed above, such as cellular SIM cards.

Input devices 1960 may include receivers or transceivers used for positioning of the computing system 1900 as well. These may include any of the wired or wireless signal receivers or transceivers. For example, a location of the computing system 1900 can be determined based on signal strength of signals as received at the computing system 1900 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1900 such as a router, modem, switch, hub, bridge, gateway, or repeater. These may also include Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1960 may include receivers or transceivers corresponding to one or more of these GNSS systems.

Display system 1970 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 1970 receives textual and graphical information, and processes the information for output to the display device. The display system 1970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1980 may include any type of computer support device to add additional functionality to the computer system. For example, peripheral device(s) 1980 may include one or more additional output devices of any of the types discussed with respect to output device 1950, one or more additional input devices of any of the types discussed with respect to input device 1960, one or more additional display systems of any of the types discussed with respect to display system 1970, one or more memories or mass storage devices or portable storage devices of any of the types discussed with respect to memory 1920 or mass storage 1930 or portable storage 1940, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1900 of FIG. 19 can include those typically found in computer systems that may be suitable for use with some aspects of the subject technology and represent a broad category of such computer components that are well known in the art. That said, the computer system 1900 of FIG. 19 can be customized and specialized for the purposes discussed herein and to carry out the various operations discussed herein, with specialized hardware components, specialized arrangements of hardware components, and/or specialized software. Thus, the computer system 1900 of FIG. 19 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1900 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1900 may also use a Basic Input/Output System (BIOS) or Unified Extensible Firmware Interface (UEFI) as a layer upon which the operating system(s) are run.

In some cases, the computer system 1900 may be part of a multi-computer system that uses multiple computer systems 1900, each for one or more specific tasks or purposes. For example, the multi-computer system may include multiple computer systems 1900 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1900 from different networks communicatively coupled together via the interne (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1920, the mass storage 1930, the portable storage 1940, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L15), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1910 for execution. A bus 1990 carries the data to system RAM or another memory 1920, from which a processor 1910 retrieves and executes the instructions. The instructions received by system RAM or another memory 1920 can optionally be stored on a fixed disk (mass storage device 1930/portable storage 1940) either before or after execution by processor 1910. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1900 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims.

Illustrative aspects of the disclosure include:

Aspect 1. An apparatus for flow control, the apparatus comprising: an annular housing; an annular rotor within the annular housing, wherein the annular rotor is configured to rotate about a central axis relative to the annular housing; a plurality of rotor blades, wherein respective bases of the plurality of rotor blades are coupled to the annular rotor, wherein respective tips of the plurality of rotor blades are directed toward the central axis; a first actuator configured to rotate the annular rotor about the central axis relative to the annular housing, wherein rotation of the annular rotor about the central axis relative to the annular housing is configured to rotate the plurality of rotor blades about the central axis relative to the annular housing; and a second actuator configured to rotate the plurality of rotor blades relative to the annular rotor, wherein actuation of the second actuator rotates a rotor blade about a rotor blade axis, the rotor blade axis extending from a base of the rotor blade toward the central axis.

Aspect 2. The apparatus of Aspect 1, wherein the first actuator includes at least one electromagnet coupled to the annular housing, wherein the first actuator is configured to rotate the annular rotor about the central axis relative to the annular housing by activating the at least one electromagnet to produce a magnetic effect on at least one portion of the annular rotor.

Aspect 3. The apparatus of Aspect 2, wherein the at least one portion of the annular rotor includes at least one of a magnet or a ferromagnetic material.

Aspect 4. The apparatus of any of Aspects 1 to 3, wherein the base of the rotor blade is coupled to the annular rotor using a fastener, and wherein the rotor blade axis extends from a position of the fastener at the base of the rotor blade.

Aspect 5. The apparatus of any of Aspects 1 to 4, wherein the second actuator is configured to rotate the plurality of rotor blades relative to the annular rotor from a first rotor blade rotation configuration to a second rotor blade rotation configuration, wherein the second rotor blade rotation configuration is associated with a higher torque than the first rotor blade rotation configuration.

Aspect 6. The apparatus of any of Aspects 1 to 5, further comprising: an annular rotor control mechanism within the annular rotor, wherein the second actuator is configured to move the annular rotor control mechanism translationally relative to the annular rotor, wherein movement of the annular rotor control mechanism translationally relative to the annular rotor is configured to push on portions of the respective bases of the plurality of rotor blades to rotate the plurality of rotor blades relative to the annular rotor.

Aspect 7. The apparatus of any of Aspects 1 to 6, further comprising: a sensor that is configured to monitor a rotational speed of the annular rotor about the central axis relative to the annular housing, wherein the second actuator is configured to rotate the plurality of rotor blades relative to the annular rotor based on the rotational speed.

Aspect 8. The apparatus of any of Aspects 1 to 7, wherein respective lengths of the plurality of rotor blades are less than a radius of the annular rotor, wherein the radius of the annular rotor is measured from the annular rotor to the central axis.

Aspect 9. The apparatus of any of Aspects 1 to 8, further comprising: a plurality of stator blades coupled to the annular housing, wherein a fluid flow passing through the annular housing is configured to reach the plurality of stator blades after reaching the plurality of rotor blades.

Aspect 10. The apparatus of any of Aspects 1 to 9, wherein the apparatus is a thruster, wherein the thruster is coupled to a vehicle, and wherein the thruster is configured to provide thrust to propel the vehicle.

Aspect 11. The apparatus of Aspect 10, wherein the thruster is coupled to the vehicle using a movable mounting mechanism that is configured to transition between a first orientation and a second orientation, wherein the thrust provided by the thruster propels the vehicle in a first direction while the movable mounting mechanism is in the first orientation, and wherein the thrust provided by the thruster propels the vehicle in a second direction while the movable mounting mechanism is in second orientation.

Aspect 12. The apparatus of any of Aspects 10 to 11, wherein the vehicle is an aircraft.

Aspect 13. The apparatus of any of Aspects 1 to 12, further comprising: a plurality of wheels coupled to the annular housing, wherein the plurality of wheels are configured to prevent translational movement of the annular rotor relative to the annular housing while the annular rotor rotates about the central axis relative to the annular housing.

Aspect 14. The apparatus of any of Aspects 1 to 13, further comprising: a plurality of electromagnets coupled to the annular housing, wherein the plurality of electromagnets are configured to prevent translational movement of the annular rotor relative to the annular housing while the annular rotor rotates about the central axis relative to the annular housing.

Aspect 15. A method for flow control, the method comprising: actuating a first actuator, wherein the first actuator is configured to rotate an annular rotor about a central axis relative to an annular housing, wherein rotation of the annular rotor about the central axis relative to the annular housing is configured to rotate a plurality of rotor blades about the central axis relative to the annular housing, wherein respective bases of the plurality of rotor blades are coupled to the annular rotor, wherein respective tips of the plurality of rotor blades are directed toward the central axis; and actuating a second actuator, wherein the second actuator is configured to rotate the plurality of rotor blades relative to the annular rotor, wherein actuation of the second actuator rotates a rotor blade about a rotor blade axis, the rotor blade axis extending from a base of the rotor blade toward the central axis.

Aspect 16. The method of Aspect 15, wherein the first actuator includes at least one electromagnet coupled to the annular housing, wherein the first actuator is configured to rotate the annular rotor about the central axis relative to the annular housing by activating the at least one electromagnet to produce a magnetic effect on at least one portion of the annular rotor.

Aspect 17. The method of Aspect 16, wherein the at least one portion of the annular rotor includes at least one of a magnet or a ferromagnetic material.

Aspect 18. The method of any of Aspects 15 to 17, wherein the base of the rotor blade is coupled to the annular rotor using a fastener, and wherein the rotor blade axis extends from a position of the fastener at the base of the rotor blade.

Aspect 19. The method of any of Aspects 15 to 18, wherein the second actuator is configured to rotate the plurality of rotor blades relative to the annular rotor from a first rotor blade rotation configuration to a second rotor blade rotation configuration, wherein the second rotor blade rotation configuration is associated with a higher torque than the first rotor blade rotation configuration.

Aspect 20. The method of any of Aspects 15 to 19, wherein the second actuator is configured to move an annular rotor control mechanism within the annular rotor translationally relative to the annular rotor, wherein movement of the annular rotor control mechanism translationally relative to the annular rotor is configured to push on portions of the respective bases of the plurality of rotor blades to rotate the plurality of rotor blades relative to the annular rotor.

Aspect 21. The method of any of Aspects 15 to 20, wherein the second actuator is configured to rotate the plurality of rotor blades relative to the annular rotor based on a rotational speed of the annular rotor about the central axis relative to the annular housing as monitored using a sensor.

Aspect 22. The method of any of Aspects 15 to 21, wherein respective lengths of the plurality of rotor blades are less than a radius of the annular rotor, wherein the radius of the annular rotor is measured from the annular rotor to the central axis.

Aspect 23. The method of any of Aspects 15 to 22, wherein the annular housing is coupled to a plurality of stator blades, wherein a fluid flow passing through the annular housing is configured to reach the plurality of stator blades after reaching the plurality of rotor blades.

Aspect 24. The method of any of Aspects 15 to 23, wherein a thruster includes the annular housing and the annular rotor and the plurality of rotor blades and the first actuator and the second actuator, wherein the thruster is coupled to a vehicle, and wherein the thruster is configured to provide thrust to propel the vehicle.

Aspect 25. The method of Aspect 24, wherein the thruster is coupled to the vehicle using a movable mounting mechanism that is configured to transition between a first orientation and a second orientation, wherein the thrust provided by the thruster propels the vehicle in a first direction while the movable mounting mechanism is in the first orientation, and wherein the thrust provided by the thruster propels the vehicle in a second direction while the movable mounting mechanism is in second orientation.

Aspect 26. The method of any of Aspects 24 to 25, wherein the vehicle is an aircraft.

Aspect 27. The method of any of Aspects 15 to 26, wherein a plurality of wheels are coupled to the annular housing and are configured to prevent translational movement of the annular rotor relative to the annular housing while the annular rotor rotates about the central axis relative to the annular housing.

Aspect 28. The method of any of Aspects 15 to 27, wherein a plurality of electromagnets are coupled to the annular housing and are configured to prevent translational movement of the annular rotor relative to the annular housing while the annular rotor rotates about the central axis relative to the annular housing.

Aspect 29: A non-transitory computer-readable medium having stored thereon instructions that, when executed by one or more processors, cause the one or more processors to: actuate a first actuator, wherein the first actuator is configured to rotate an annular rotor about a central axis relative to an annular housing, wherein rotation of the annular rotor about the central axis relative to the annular housing is configured to rotate a plurality of rotor blades about the central axis relative to the annular housing, wherein respective bases of the plurality of rotor blades are coupled to the annular rotor, wherein respective tips of the plurality of rotor blades are directed toward the central axis; and actuate a second actuator, wherein the second actuator is configured to rotate the plurality of rotor blades relative to the annular rotor, wherein actuation of the second actuator rotates a rotor blade about a rotor blade axis, the rotor blade axis extending from a base of the rotor blade toward the central axis.

Aspect 30: The non-transitory computer-readable medium of Aspect 29, further comprising operations according to any of Aspects 2 to 14, and/or any of Aspects 16 to 28.

Aspect 31: An apparatus for image processing, the apparatus comprising: means for actuating a first actuator, wherein the first actuator is configured to rotate an annular rotor about a central axis relative to an annular housing, wherein rotation of the annular rotor about the central axis relative to the annular housing is configured to rotate a plurality of rotor blades about the central axis relative to the annular housing, wherein respective bases of the plurality of rotor blades are coupled to the annular rotor, wherein respective tips of the plurality of rotor blades are directed toward the central axis; and means for actuating a second actuator, wherein the second actuator is configured to rotate the plurality of rotor blades relative to the annular rotor, wherein actuation of the second actuator rotates a rotor blade about a rotor blade axis, the rotor blade axis extending from a base of the rotor blade toward the central axis.

Aspect 32: The apparatus of Aspect 31, further comprising means for performing operations according to any of Aspects 2 to 14, and/or any of Aspects 16 to 28.

What is claimed is:

1. An apparatus for flow control, the apparatus comprising:
    an annular housing;
    an annular rotor within the annular housing, wherein the annular rotor rotates about a central axis relative to the annular housing;
    a plurality of rotor blades, wherein respective bases of the plurality of rotor blades are coupled to the annular rotor, wherein respective tips of the plurality of rotor blades are directed toward the central axis;
    a first actuator configured to rotate the annular rotor about the central axis relative to the annular housing, wherein rotation of the annular rotor about the central axis relative to the annular housing rotates the plurality of rotor blades about the central axis relative to the annular housing; and
    a second actuator configured to rotate the plurality of rotor blades relative to the annular rotor, wherein actuation of the second actuator rotates each rotor blade about a respective rotor blade axis thereof,
    wherein for each rotor blade:
        a base of the rotor blade is coupled to the annular rotor using a fastener, and
        the respective rotor blade axis thereof extends from a position of the fastener at the base of the rotor blade toward the central axis.

2. The apparatus of claim 1, wherein the first actuator includes at least one electromagnet coupled to the annular housing, wherein the first actuator rotates the annular rotor about the central axis relative to the annular housing by activating the at least one electromagnet to produce a magnetic effect on at least one portion of the annular rotor.

3. The apparatus of claim 2, wherein the at least one portion of the annular rotor includes a magnet.

4. The apparatus of claim 2, wherein the at least one portion of the annular rotor includes a ferromagnetic material.

5. The apparatus of claim 1, wherein the second actuator rotates the plurality of rotor blades relative to the annular rotor from a first rotor blade rotation configuration to a second rotor blade rotation configuration, wherein the second rotor blade rotation configuration is associated with a higher torque than the first rotor blade rotation configuration.

6. The apparatus of claim 1, further comprising:
    a ring within the annular rotor, wherein the ring includes a plurality of protrusions extending from the ring, wherein the second actuator moves the ring translationally relative to the annular rotor, wherein movement of the ring translationally relative to the annular rotor causes the plurality of protrusions that extend from the ring to push on portions of the respective bases of the plurality of rotor blades to achieve the rotation of the plurality of rotor blades relative to the annular rotor.

7. The apparatus of claim 1, further comprising:
    a sensor that monitors a rotational speed of the annular rotor about the central axis relative to the annular housing, wherein the second actuator rotates the plurality of rotor blades relative to the annular rotor based on the rotational speed.

8. The apparatus of claim 1, wherein respective lengths of the plurality of rotor blades are less than a radius of the annular rotor, wherein the radius of the annular rotor is measured from the annular rotor to the central axis.

9. The apparatus of claim 1, further comprising:
    a plurality of stator blades coupled to the annular housing, wherein a fluid flow passing through the annular housing follows a path that reaches the plurality of stator blades after reaching the plurality of rotor blades.

10. The apparatus of claim 1, wherein a thruster is coupled to a vehicle, wherein the thruster provides thrust to propel the vehicle, wherein the thruster includes at least the annular housing, the annular rotor, the plurality of rotor blades, the first actuator, and the second actuator.

11. The apparatus of claim 10, wherein the thruster is coupled to the vehicle using a mount, wherein at least a portion of the mount rotates about a mount axis to transition the thruster between a first orientation relative to the vehicle and a second orientation relative to the vehicle, wherein the thrust provided by the thruster propels the vehicle in a first direction while the thruster is in the first orientation, and wherein the thrust provided by the thruster propels the vehicle in a second direction while the thruster is in the second orientation.

12. The apparatus of claim 10, wherein the vehicle is an aircraft.

13. The apparatus of claim 1, further comprising:
a plurality of wheels coupled to the annular housing, wherein the plurality of wheels are configured to prevent translational movement of the annular rotor relative to the annular housing while the annular rotor rotates about the central axis relative to the annular housing.

14. The apparatus of claim 1, further comprising:
a plurality of electromagnets coupled to the annular housing, wherein the plurality of electromagnets are configured to prevent translational movement of the annular rotor relative to the annular housing while the annular rotor rotates about the central axis relative to the annular housing.

15. A method for flow control, the method comprising:
actuating a first actuator, wherein the first actuator rotates an annular rotor about a central axis relative to an annular housing, wherein rotation of the annular rotor about the central axis relative to the annular housing rotates a plurality of rotor blades about the central axis relative to the annular housing, wherein respective bases of the plurality of rotor blades are coupled to the annular rotor, wherein respective tips of the plurality of rotor blades are directed toward the central axis; and
actuating a second actuator, wherein the second actuator rotates the plurality of rotor blades relative to the annular rotor, wherein actuation of the second actuator rotates each rotor blade about a respective rotor blade axis thereof,
wherein for each rotor blade:
a base of the rotor blade is coupled to the annular rotor using a fastener, and
the respective rotor blade axis thereof extends from a position of the fastener at the base of the rotor blade toward the central axis.

16. The method of claim 15, wherein the first actuator includes at least one electromagnet coupled to the annular housing, wherein the first actuator rotates the annular rotor about the central axis relative to the annular housing by activating the at least one electromagnet to produce a magnetic effect on at least one portion of the annular rotor.

17. The method of claim 15, wherein the second actuator rotates the plurality of rotor blades relative to the annular rotor from a first rotor blade rotation configuration to a second rotor blade rotation configuration, wherein the second rotor blade rotation configuration is associated with a higher torque than the first rotor blade rotation configuration.

18. The method of claim 15, wherein the second actuator moves a ring within the annular rotor translationally relative to the annular rotor, wherein the ring includes a plurality of protrusions extending from the ring, wherein movement of the ring translationally relative to the annular rotor is causes the plurality of protrusions that extend from the ring to push on portions of the respective bases of the plurality of rotor blades to achieve the rotation of the plurality of rotor blades relative to the annular rotor.

19. The method of claim 15, wherein the second actuator rotates the plurality of rotor blades relative to the annular rotor based on a rotational speed of the annular rotor about the central axis relative to the annular housing as monitored using a sensor.

20. The method of claim 15, wherein the annular housing is coupled to a plurality of stator blades, wherein a fluid flow passing through the annular housing follows a path that reaches the plurality of stator blades after reaching the plurality of rotor blades.

* * * * *